United States Patent [19]

Gooding et al.

[11] 4,001,570
[45] Jan. 4, 1977

[54] ARITHMETIC UNIT FOR A DIGITAL DATA PROCESSOR

[75] Inventors: David N. Gooding, Endicott; Everett M. Shimp, Endwell, both of N.Y.

[73] Assignee: International Business Machines Corporation, Armonk, N.Y.

[22] Filed: June 17, 1975

[21] Appl. No.: 587,797

[52] U.S. Cl. .............................................. 235/174
[51] Int. Cl.² ..................................... G06F 7/385
[58] Field of Search .................................. 235/174

[56] References Cited

UNITED STATES PATENTS

| | | | |
|---|---|---|---|
| 3,508,037 | 4/1970 | Collins et al. | 235/174 X |
| 3,752,394 | 8/1973 | Igel | 235/174 |

OTHER PUBLICATIONS

IBM Field Engineering Manual of Instruction—System/360 Model 50—Comprehensive Introduction, IBM Pub. No. SY22-2821-0, 4th ed., 1966, pp. 38-49.
IBM Field Engineering Theory of Operation—System/360 Model 50—Functional Units, IBM Pub. No. SY22-2822-1, 5th ed., 1965, pp. 35-41.
IBM Field Engineering Theory of Operation—System/360 Model 50-RS, SI, SS Instructions, IBM Pub. No. SY22-2825-1, 6th ed., 1966, pp. 55-58 and 68-74.
Franklin, J. W. Zoned or Packed Decimal Operand Detector, IBM Tech. Disc. Bull. 15(7): Dec. 1972, pp. 2097-2098.

*Primary Examiner*—R. Stephen Dildine, Jr.
*Attorney, Agent, or Firm*—Richard E. Bee

[57] ABSTRACT

A digital arithmetic unit for adding and subtracting multidigit binary coded decimal numbers having a zoned format. Such adding and subtracting is done by means of a parallel binary adder of a type suitable for handling pure binary numbers and having no special provisions for accommodating zoned decimal numbers. The two multidigit zoned decimal numbers to be added or subtracted at any given moment are supplied to the two input sides of such binary adder by way of input modifier circuits which precondition the zone and sign fields in such numbers to enable the proper propagation of digit carries across such zone and sign fields during the performance of the addition inside the binary adder. The resulting binary bit sequence appearing at the output side of the binary adder is passed to an output modifier or corrector which causes the bits in the zone and sign field positions therein to assume the proper zone and sign code values. The input modifier circuitry for one of the numbers also includes circuitry for increasing the value of each digit in such number by a factor of six for enabling the proper generation of digit carries inside the binary adder. The output corrector includes circuitry for reducing, when necessary, the value of one or more of the output digits by a factor of six to offset the increase in the input digits. Subtraction is accomplished by complementing one of the numbers before it is supplied to the binary adder. Sign handling circuitry detects the polarities or signs of the two input numbers as well as the status of an external add/subtract command and processes these three factors to develop a control signal for controlling the use of the complementing action for enabling the number appearing at the output of the output corrector to be in true magnitude form whenever possible. The input modifier circuitry, the output corrector and the sign handling circuitry are constructed so that packed binary coded decimal numbers and pure binary numbers can also be handled by the arithmetic unit.

14 Claims, 14 Drawing Figures

ARITHMETIC UNIT FOR A DIGITAL DATA PROCESSOR

BACKGROUND AND SUMMARY OF THE INVENTION

This invention relates to arithmetic units for use in digital computers and digital data processors for adding and subtracting binary and binary coded decimal numbers.

As is known, many present day digital computers and digital data processing machines are capable of performing decimal arithmetic as well as the more classical binary arithmetic. For many applications, particularly business and commercial type applications, there are definite advantages in using decimal arithmetic. For most data processors presently on the market, however, the performance of decimal arithmetic is very slow compared to the performance of binary arithmetic. A primary purpose of the present invention, therefore, is to provide a new and improved arithmetic unit for enabling a data processor to perform decimal arithmetic operations with significantly greater speed and, in many cases, with a speed very nearly approaching the speed for the corresponding binary arithmetic operations with operands of comparable width.

In accordance with one feature of the present invention, the speed of performing decimal operations is improved by providing an arithmetic unit which can operate directly on decimal data in zoned format and without having to first convert such data to a packed format. To fully appreciate the significance of this, it must be recognized that many present day input and output devices for supplying data to and receiving data from a data processor are constructed to transmit and receive data in the form of 8-bit binary coded characters encoded in accordance with the well-known Extended Binary Coded Decimal Interchange Code (EBCDIC). Each such 8-bit character represents one alphabetical letter or one numerical digit or one graphic symbol such as a dollar sign, semicolon, etc. For the case of a numerical character, the higher order four bits are called a zone field and the lower order four bits are called a digit field. The coding for the 4 bits in the zone field is 1111 if the 4 bits in the digit field represent a decimal digit in eight-four-two-one binary coded decimal form. Numerical data having this 8-bit zone/digit construction for each numerical character is said to be in zoned format. As is apparent, only the 4-bit digit fields are of interest for purposes of performing arithmetic computations.

Since the numerical data from the input device is usually coming into the data processor in zoned decimal format; it would be desirable to be able to supply zoned decimal numbers to the arithmetic unit, perform the desired addition or subtraction with such zoned decimal numbers and end up with zoned decimal answers which can be sent to one or more output devices without need for any further special treatment. Unfortunately, this is not possible with most present day data processors. The presence of the zone field bits in the arithmetic unit would mess up the arithmetic computation.

In most present day data processors, what is actually done is to convert the zoned decimal numerical data into a packed decimal format before performing the arithmetic computation. This is accomplished by stripping off the zone field bits and using only the digit field bits. Afte performing the desired arithmetic operation, the resultant data must then be converted back into the zoned format before it is sent to an output device. This converting back is called "unpacking. This packing and unpacking procedure is time consuming. The present invention elimination the need for same. The present invention provides an arithmetic unit which will accept numercial data in zoned decimal format as a valid input, perform the desired decimal operation, and output the result in zone chemical format.

There has been at least one previous proposal for providing an arithmetic unit which can operate with zoned decimal data. This proposal is set forth in U.S. Pat. No. 3,752,394, granted Aug. 14, 1973, entitled "Modular Arithmetic and Logic Unit" and assigned to International Business Machines Corporation of Armonk, New York. This patent describes an arithmetic unit wherein the arithmetic operations are performed by a one-byte or eight-bit borrow look-ahead subtractor. When handling zoned decimal numerical characters, the borrow look-ahead circuitry is internally modified so that the borrow look-ahead circuits for the zone field bits are bypassed and the borrow-out signal for the highest order digit field bit is used as the borrow-out signal for the character or byte as a whole. Presumably, when adding or subtracting multidigit zoned decimal numbers, the individual zoned digits for successively higher order digit positions are added or subtracted during successive machine cycles, with the character borrow-out for one machine cycle being saved and used as the character borrow-in for the next machine cycle. In such case, the bypassing of the zone field borrow look-ahead stages prevents the zone fields from messing up the computation. This is accomplished, however, with some sacrifice in speed. In particular, the circuits which enable the bypassing of the zone field stages introduce two stages of delay per character or byte. By contrast, an arithmetic unit constructed in accordance with the present invention avoids this type of delay and hence is better suited for handling multibyte or multidigit zoned chemical numbers. Also, the present invention enables all the digits of two multidigit zoned decimal numbers to be added or subtracted during one and the same machine cycle, provided, of course, that the widths of the numbers do not exceed the data flow width of the arithmetic unit.

In accordance with another feature of the invention, the speed of decimal operations is further improved by providing an arithmetic unit having built therein the necessary hardware for knowing when to "subtract" even though the program instruction says to "add" and vice versa. The problem arises because the decimal numbers being processed may be either positive or negative. Consequently, to add two decimal numbers together, it is not as simple as presenting two input numbers of operands to the arithmetic unit and simply telling such arithmetic unit to "add." The decimal numbers are represented in true magnitude form with the sign position specifying whether the operand is positive or negative. Therefore, if an add operation is desired and one operand is positive while the other is negative, the arithmetic unit should perform a subtraction operation to calculate a correct result in true magnitude form. Conversely, if a subtract operation were desired with operands of different signs, the arithmetic unit should perform an add operation to obtain the correct output.

The majority of present day general purpose data processing machines are of the microprogrammed or microcoded type. In such machines, this sign interpretation for decimal operands is done by microcode branching prior to the actual arithmetic unit operation and the signs are masked off before entering the arithmetic unit. Likewise, the preferred resultant sign is reinserted by the microcode after the arithmetic unit operation. The arithmetic unit hardware acts as a slave to the microprogrammed instructions and is presented only valid decimal digit codes with the sign codes having previously been removed.

To perform each of these decimal sign handling functions in microcode, many microwords are executed for each decimal arithmetic operation and thus the performance of a decimal operation as compared to a binary operation is very slow. A significant feature of the present invention is the provision of a hardware mechanism for enabling the arithmetic unit itself to automatically perform the correct arithmetic operation, thus eliminating the need for the various previously used and time consuming microcode steps.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings

DESCRIPTION OF THE FIG. 1 ARITHMETIC UNIT

Figure 1:
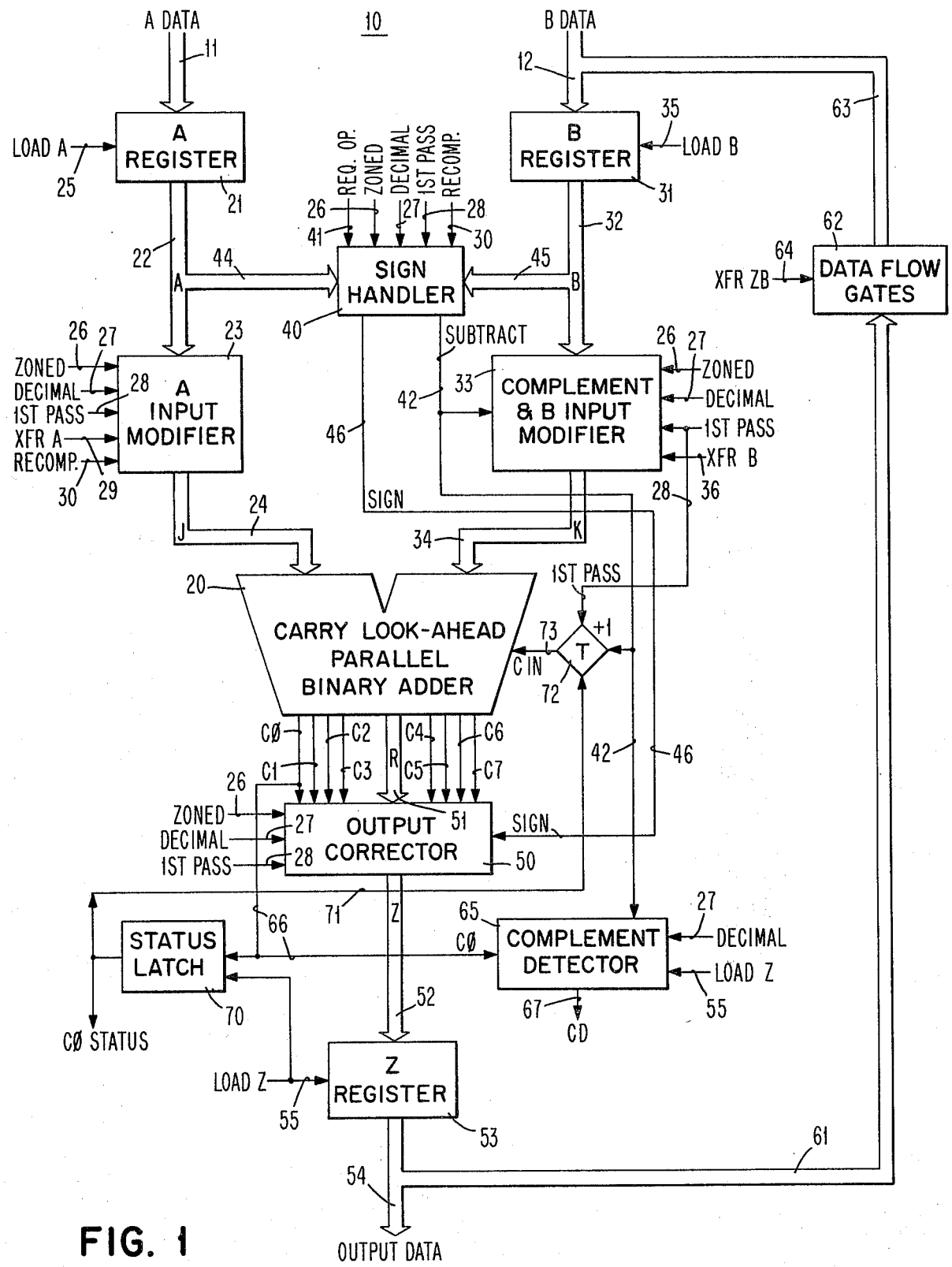
FIG. 1 is a functional block diagram of a representative embodiment of an arithmetic unit constructed in accordance with the present invention.

Referring to FIG. 1, there is shown a preferred form of construction for a digital arithmetic unit constructed in accordance with the present invention. FIG. 1 shows an arithmetic unit 10 for performing arithmetic operations with multidigit binary coded decimal numbers in either zoned decimal format or packed decimal format. The arithmetic unit 10 can also be used in the performance of binary arithmetic operations as well as the other customary data processing operations. The arithmetic unit 10 is particularly useful in the arithmetic and logic unit (ALU) section of a large scale general purpose digital data processing machine of either the microprogrammed or nonmicroprogrammed type. For sake of example only, the functional data flow units and data flow buses shown in FIG. 1 are assumed to have a data flow width of four bytes (32 bits). It is to be understood, however, that the basic techniques described herein are equally applicable to data flows of greater and lesser width. In some respects, the wider the data flow width, the greater the performance improvement realized by using the teachings of the present invention.

Figure 2:
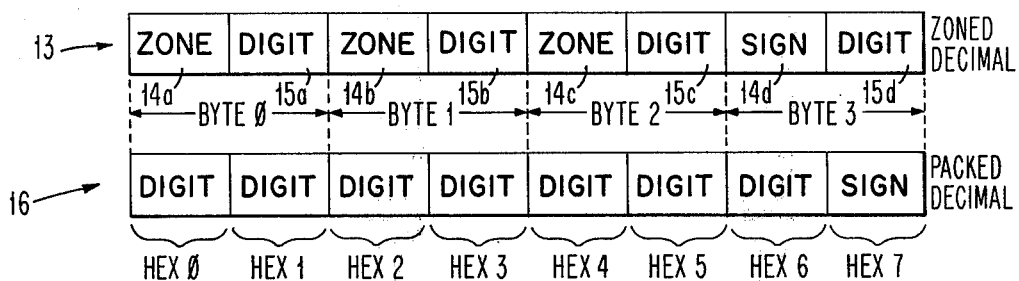
FIG. 2 is a diagram showing the types of zoned decimal and packed decimal data formats which can be handled by the arithmetic unit of FIG. 1.

The numbers or operands supplied to the A side and B side input data buses 11 and 12 of the arithmetic unit 10 may be in either zoned decimal or packed decimal format or ordinary binary format. The nature of the decimal formats is illustrated in FIG. 2 for the case of operands having a width of four bytes or 32 bits. The zoned decimal format shown at 13 is comprised of a sequence of M binary bits which is subdivided into alternate N-bit zone fields and N-bit digit fields. In the present embodiment, M=32 and N=4. The zone fields are indicated at 14a, 14b, 14c and 14d, while the digit fields are indicated at 15a, 15b, 15c and 15d. The significance of the digits increases from right to left, the most significant or highest order digit being on the left and the least significant or lowest order digit being on the right. The zone field identified as 14d and located adjacent to the least significant digit field 15d is used as a polarity-indicating sign field, the coding of the four bits therein indicating whether the multidigit number is positive or negative. Each byte of zoned decimal data is comprised of 8 binary bits, the four higher order bits being a zone field and the four lower order bits being a digit field. Thus, for example, byte $\phi$ is comprised of zone field 14a and digit field 15a. Each 8-bit byte of zoned chemical data corresponds to one character in the Extended Binary Coded Decimal Interchange Code (EBCDIC) used by a large number of the present day input and output units which supply data to and receive data from a data processing machine. For the case of numerical data, each 4-bit digit field represents one decimal digit and the bits therein are coded in accordance with the known eight-four-two-one binary coded decimal code. This code is shown in Table I.

TABLE I

| Decimal Digit Codes | |
|---|---|
| Decimal Digit | Binary Coded Decimal Digit |
| 0 | 0000 |

TABLE I-continued

| Decimal Digit Codes | |
|---|---|
| Decimal Digit | Binary Coded Decimal Digit |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

For numerical data, the EBCDIC zone code is 1111, that is, each of the 4 bits in the zone field has a binary value of one.

The permissible sign codes for the sign field 14d in decimal operands are set forth in Table II.

TABLE II

| Decimal Sign Codes | | |
|---|---|---|
| Sign | Hex Code | Binary Code |
| + | A | 1010 |
| − | B | 1011 |
| + | C | 1100 |
| − | D | 1101 |
| + | E | 1110 |
| + | F | 1111 |

Using these zone, digit and sign codes, the four-digit positive decimal number +1975 would be represented in zoned decimal format by the following sequence of 32 binary digits:

1111 0001 1111 1001 1111 0111 1111 0101 where the binary code 1111 is used for the plus sign.

For various purposes herein, it is more convenient to use hexadecimal (base sixteen) number notation. The relationship between decimal and hexadecimal (hex) numbers, as well as the 4-bit binary codes for the hexadecimal digits, is set forth in Table III.

TABLE III

| Hexadecimal Digit Codes | | |
|---|---|---|
| Decimal Value | Hex Digit | Binary Coded Hex Digit |
| 0 | 0 | 0000 |
| 1 | 1 | 0001 |
| 2 | 2 | 0010 |
| 3 | 3 | 0011 |
| 4 | 4 | 0100 |
| 5 | 5 | 0101 |
| 6 | 6 | 0110 |
| 7 | 7 | 0111 |
| 8 | 8 | 1000 |
| 9 | 9 | 1001 |
| 10 | A | 1010 |
| 11 | B | 1011 |
| 12 | C | 1100 |
| 13 | D | 1101 |
| 14 | E | 1110 |
| 15 | F | 1111 |

Using this hexidecimal notation, the decimal number +1975 in zoned decimal format can be represented as:

F1F9F7F5 where the hex digit F is used to denote the zone field code of 1111. This hexidecimal representation is easier to use and visualize than is the actual binary representation and will at times be used herein to represent the actual binary bit sequences. As seen by comparing Tables I and III, the binary codes for digits 0–9 are identical in both the decimal and hexadecimal systems.

As seen from Table III, the hexadecimal system uses all of the various possible combinations of 1's and 0's that can occur for a group of 4 bits. Thus, a 4-bit system is actually a hexadecimal system. For this reason, a 4-bit field will sometimes herein be referred to as a hexadecimal or hex field. In particular and for sake of general identification, the 8 4-bit field positions in FIG. 2 will be designated as hex fields $\phi$-7, respectively, with hex field $\phi$ being the highest order field and hex field 7 being the lowest order field.

The packed decimal format for binary coded decimal numbers is indicated at 16 in FIG. 2. The sequence of 32 binary digits or bits is again subdivided into eight 4-bit fields. In this case, however, each 4-bit field is a digit field except that the lowest order field, namely, the hex 7 field, is a polarity-indicating sign field used to indicate whether the number is a positive or negative number. Each digit field uses the binary coded decimal coding set forth in Table I. The sign field uses the binary codes set forth in Table II.

The decimal number +1975 in packed binary coded decimal format would be:

0000 0001 1001 0111 0101 1100 where the sign code 1100 is used to denote the positive sign. Using hexadecimal notation, this becomes:

0195C

The four leading zeros in the binary representation correspond to the one leading zero in the hexadecimal representation. They are employed to make the total number of bits correspond to an integral number of bytes. This is because most present day data processors operate on a byte basis and no partial bytes are allowed.

In a typical present day data processor, the numerical data is received from the input devices in the zoned decimal format. Such data is then converted to the packed decimal format before performing any arithmetic operations therewith. This is accomplished by removing the zone fields, changing the relative position of the sign field and then assembling the resulting digit fields and sign field in the adjacent side-by-side manner indicated in FIG. 2. After performance of the desired arithmetic operation, the resulting number is then converted back into a zoned decimal format to place same in proper form for transmission to an output device. A feature of the arithmetic unit 10 of FIG. 1 is that it can operate directly on decimal data in zoned format and without having to first convert such data to a packed format. Where desired, the arithmetic unit 10 can also operate on decimal data in the packed format as well as on pure binary data.

An arithmetic unit constructed in accordance with the present invention includes binary arithmetic circuitry for arithmetically combining two M-bit binary bit sequences to produce an output M-bit binary bit sequence representing the results of the arithmetic operation. In the FIG. 1 embodiment, this binary arithmetic circuitry is comprised of a parallel binary adder 20 of the carry look-ahead type for simultaneously adding two 32-bit binary bit sequences to produce an outout 32-bit binary bit sequence representing the sum of the two input bit sequences. The binary adder 20 is of a straightforward carry look-ahead construction suitable for adding two pure binary numbers. It has no special provision for accommodating zoned decimal numbers. It treats the binary bit sequences supplied to the two input sides thereof the same as if they were two pure binary numbers and the resulting output bit sequence represents the sum of the two input bit sequences on a purely binary basis.

The arithmetic unit 10 further includes first input circuitry for receiving a first multidigit binary coded number or operand and supplying same to a first input of the binary adder 20. This first input circuitry includes the A input data bus 11, such data bus 11 having 32 conductors for accommodating the 32 input data bits, a 32-stage A register 21, a 32-conductor data bus 22, a 32-stage A input modifier 23 and a 32-conductor data bus 24 which feeds the 32-bit data bit sequence to the left side or A side input of the binary adder 20.

The A input modifier 23 has four possible operating modes or operating conditions. If the arithmetic unit 10 is processing pure binary numbers, then the A input modifier 23 merely passes such binary numbers on to the left side input of the adder 20 without modification. If the arithmetic unit 10 is processing zoned binary coded decimal numbers, then the modifier 23 acts to modify same by causing any nonzero bits in the zone and sign fields thereof to assume a binary value of zero. This is accomplished by forcing each bit in the zone and sign field positions to assume a binary value of zero. The bits in the digit field positions are not modified. The resulting bit sequence is then supplied to the left side input of the adder 20.

For the case of packed decimal numbers, modifier 23 modifies only the sign field portion thereof. In particular, the modifier 23 forces the 4 bits in the sign field position to assume a binary value of zero.

The fouth operating mode is a recomplement mode which is used when it is desired to recomplement a resultant number appearing at the output of adder 20. In this case, the A input modifier 23 is operated so that all 32 output bits thereof have a value of zero. Thus, when doing a recomplement operation, the number value supplied to the left side input of the adder 20 is zero.

The particular operating mode provided by the A input modifier 23 is selected by means of external control signals supplied thereto by way of conductors or control lines 26–28 and 30. A transfer signal on control line 29 initiates the flow of the operand in A register 21 through the A input modifier 23 and into the adder 20.

The arithmetic unit 10 also includes second input circuitry for receiving a second multidigit binary coded number and supplying same to the second or right side input of the binary adder 20. This second input circuitry includes the 32-conductor B input data bus 12, a 32-stage B register 31, a 64-conductor data bus 32 (both true and complement lines from each of the 32 stages in B register 31), a 32-stage complement and B input modifier 33 and a 32-conductor data bus 34 which feeds the B side input data to the right side or B side input of the binary adder 20. The complement and B input modifier 33 performs four basic types of functions, namely: (1) a zone/sign field modifier or preconditioning function for decimal numbers; (2) a complement function for subtracting binary and decimal numbers; (3) a "plus six" function for adding decimal numbers; and (4) a "true" function for adding binary numbers.

The zone/sign field preconditioning function is used for the case of binary coded decimal numbers and operates to cause any zero bits in the zone and sign fields thereof to assume a binary value of one and then supplying the resulting 1111 zone and sign fields to the right side input of the adder 20. For the case of zoned decimal numbers, this is accomplished by forcing each bit in the zone and sign fields thereof to assume a binary value of one. In the case of a packed decimal number, this is accomplished by forcing each bit in the sign field thereof to assume a binary value of one.

The complement function is used for causing the arithmetic unit 10 to perform a subtraction operation. Subtraction is performed by adding the A side input operand to the complement of the B side input operand. For binary numbers, unit 33 enables the complement of the operand in B register 31 to be supplied to the right side input of the adder 20. The same is true for decimal operands but only for the digit field portions thereof. The zone and sign fields are subject to the one forcing preconditioning action discussed in the preceding paragraph.

The "plus six" function is used when performing an addition with decimal numbers. Thus, when adding either zoned or packed decimal numbers, the B input modifier 33 operates to cause the number value in each of the digit fields to be increased by a factor of six. This is done to enable the proper generation of digit carries inside the binary adder 20 and is necessitated by the difference in the decimal (base 10) and the hexadecimal (base 16) number systems. In other words, a 4-bit digit field is, from the standpoint of the adder 20, a hexadecimal system, while the incoming decimal numbers are a decimal system. By adding six to one of the decimal digit values being added in any given digit position, the 4-bit adder portion for such digit position will produce a digit field carry-out when the sum of the two decimal digit values equals or exceeds a decimal value of 10, which, of course, is the desired result when adding two decimal digits.

It is not necessary to add six when subtracting decimal numbers because the complementing action automatically takes into account the difference in the two number systems in terms of producing the proper digit carry-outs. In particular, the complement action in the unit 33 takes the fifteen's complement of each 4-bit digit field. For decimal digits, this is equivalent to taking the nine's complement and adding six.

The "true" function is used when performing an addition with binary numbers. In such case, unit 33 enables the operand in B register 31 to be supplied to the right side input of adder 20 in true or unmodified form.

From the foregoing, it is seen that when adding binary numbers, unit 33 supplies the B side input operand without modification to the right side input of adder 20. When subtracting binary numbers, unit 33 supplies the complement of the B side input operand to the adder 20. When adding zoned decimal numbers, units 33 adds six to each digit field and at the same time forces each bit in the zone and sign fields to assume a binary value of one. When subjecting zoned decimal numbers, unit 33 complements the digit fields and at the same time forces each bit in the zone and sign fields to assume a binary value of one. When adding packed decimal numbers, unit 33 adds six to each digit field and at the same time forces each bit in the sign field to assume a binary value of one. When subtracting packed decimal numbers, unit 33 complements each digit field and at the same time forces each bit in the sign field to assume a binary value of one.

The particular action performed in unit 33 is determined in part by the external control signals supplied thereto by way of control lines 26–28. A transfer signal on control line 36 initiates the selected operation in the modifier unit 33 for the operand contained in the B register 31.

From the foregoing, it is seen that when performing arithmetic operations on zoned decimal numbers, that the zone and sign field bits therein are peconditioned before the numbers are supplied to the adder 20. In particular, the zone and sign field bits in the A side input operand are all set to a binary zero value while the zone and sign field bits in the B side input operand are all set to a binary one value. This preconditioning enables the proper propagation of digit carries across the zone and sign fields during the performance of the addition inside the adder 20. As a consequence of this, the digit fields in the output bit sequence produced by the adder 20 have the same values they would have had if the zone and sign fields had not been present in the first place.

For the case of packed decimal numbers, the preconditioning is provided for the sign fields thereof to enable the proper propagation of any external carry-in signal across the sign field during the performance of the addition in the adder 20.

The arithmetic unit 10 further includes sign handling circuitry for use when processing decimal numbers for automatically controlling the true/complement/plus six circuitry in the unit 33 for enabling the performance of the proper arithmetic operation by the arithmetic unit 10. This sign handling circuitry is comprised of a sign handler 40 which is responsive to the polarity sign fields in the two decimal numbers being processed and to an external selection signal supplied by way of a control line 41 for developing on an output conductor 42 an add/subtract control signal which is supplied to unit 33 for selectively disabling and enabling the complementing action therein. For sake of a name, the external selection signal on control line 41 is called "Requested Operation" (Req. Op.). Such signal provides a positive indicating value when addition is requested and a negative indicating value when subtraction is requested. In the present embodiment, the positive or addition indicating value is represented by a binary zero level on control line 41 and the negative or subtraction indicating value is represented by a binary one level on the control line 41.

The decimal sign field for the A side input operand is made available to the sign handler 40 by means of an eight-conductor data bus 44 which receives from the A register 21 the 4-bits in the hex six field position and the 4 bits in the hex seven field position. The decimal sign field for the B side input operand is made available to the sign handler 40 by way of an eight-conductor data bus 45 which receives from the B register 31 the 4 bits in the hex six field position and the 4 bits in the hex seven field position. As indicated in FIG. 2, the zoned decimal sign fields are in the hex six field positions and the packed decimal sign fields are in the hex seven field positions.

The logic performed by the sign handler 40 to produce the desired add/subtract control signal on output line 42 is summarized in Table IV.

TABLE IV

| | Sign Handling Logic | | |
|---|---|---|---|
| Requested Operation | Sign of Operand A | Sign of Operand B | Executed Operation |
| + | + | + | + |
| + | + | − | − |
| + | − | + | − |
| + | − | − | + |
| − | + | + | − |
| − | + | − | + |
| − | − | + | + |
| − | − | − | − |

The plus (+) and minus (−) values in the left-hand "Requested Operation" column are for the external selection signal on control line 41. An addition requesting plus (+) sign denotes the occurrence of a binary zero level on control line 41 while a subtraction requesting minus (−) sign denotes the occurrence of a binary one level on control line 41. The right-hand column, labeled "Executed Operation", indicates the status of the resulting signal produced on the add/subtract control signal output line 42. A plus (+) in the right-hand column indicates addition and, in the present embodiment, denotes the occurrence of a binary zero level on the output line 42. A minus (−) sign in the right-hand column indicates subtraction and denotes the occurrence of a binary one level on the output line 42.

As indicated by Table IV, the sign handler 40 manipulates the complement circuitry in unit 33 to cause the arithmetic unit 10 to add the A and B input operands when none or an even number of the three input polarity factors is negative and to subtract the A and B input operands when an odd number of the three input polarity factors is negative.

As will be seen, the sign handler 40 also includes sign control circuitry for developing a sign control signal on a second output conductor 46. This sign control signal is used when processing decimal numbers to set the proper polarity the sign field in the final output number produced by the arithmetic unit 10.

The arithmetic unit 10 further includes output modifier circuitry or output corrector circuitry 50 coupled to the output of the binary adder 20 for receiving the 32-bit output binary bit sequence produced by the binary adder 20 and operative when handling zoned decimal numbers for producing an output binary bit sequence wherein the bits in the zone and sign field positions have the proper zone and sign code values. In the present embodiment, this is accomplished by forcing the bits in each zone field position to assume a binary value of one. At the same time, the bits in the sign field position are forced to have the preferred polarity indicative sign code, such forcing being accomplished with the aid of the sign control signal on control line 46.

When handling packed decimal numbers or operands, the output corrector 50 operates to force the bits in the packed decimal sign field position to assume the proper sign code values, this forcing action again being dependent on the sign control signal on control line 46. When operating with either zoned or packed decimal numbers, this sign control signal sets the sign field in the output number to indicate the same polarity as indicated by the sign field of the A input operand in the A register 21, using for this purpose the proper one of the preferred output sign codes.

The 32-bit output binary bit sequence produced by the binary adder 20 is supplied to the output corrector 50 by means of a 32-conductor data bus 51. The 32-bit output binary bit sequence produced by the output corrector 50 is, in turn, supplied by way of a 32-conductor data bus 52 to a 32-stage output register represented by Z register 53. The output data for the arithmetic unit 10 as a whole, appears on a further 32-conductor data bus 54 which is coupled to the output side of the output register or Z register 53.

When processing zoned decimal and packed decimal operands, it is sometimes necessary for the output corrector 50 to correct the number values in some of the digit fields by decreasing same by a factor of six to offset the plus six action occurring in the complement and B input modifier 33. The need for such minus six correction is determined by examining the status of the hex field carry-out signals generated inside the binary adder 20. These hex field carry-out signals are made available to the output corrector 50 by way of carry-out status lines $C\phi$-C7. $C\phi$ is the carry-out status line for hex field zero, C1 is the carry-out status line for hex field one, C2 is the carry-out status line for hex field two and so forth.

If a hex field carry-out does occur during the addition process in adder 20, then no correction is required for the corresponding output digit field. If, on the other hand, there is no occurrence of a hex field carry-out during the addition process, then it is necessary to correct the corresponding output digit field by decreasing its digit value by a factor of six. In the present embodiment, this decreasing by six action is accomplished by instead taking the equivalent action of increasing the digit value by a factor of ten (hexadecimal factor of "A"). The correct result is obtained because ten is the sixteen's complement of six. Thus, for the case of a 4-bit field, adding ten is the same as subtracting six. This +10 action is performed inside the output corrector 50 and, as will be seen, the carry-out produced by such action is not propagated to the next higher hex field position. In other words, each 4-bit hex field is treated as a separate entity.

Assume that a 32-bit decimal bit sequence is supplied to the output corrector 50 and consider, for example, the digit field located in the hex 5 position. If a hex 5 carry-out does appear on the C5 status line, then such digit field in the hex 5 position is okay as is and is not modified. If, on the other hand, no carry-out signal appears on the C5 status line, then the digit field in the hex 5 position is corrected by decreasing its value by a factor of six or, alternatively, by increasing its value by a factor of ten (more accurately, by a hexadecimal factor of "A"). Each of the other digit fields in the zoned decimal sequence is treated in a similar manner, such treatment being performed on an individual digit-field-by-digit-field basis. In other words, the treatment given a particular digit field is independent of the treatment given the other digit fields.

In the case of a zoned decimal bit sequence, the carry-out lines $C\phi$, C2, C4 and C6 for the zone and sign field positions are ignored in the present embodiment. As previously indicated, the zone and sign fields are instead forced to assume the proper zone and sign code values. In the case of a packed decimal output, the C7 carry-out is ignored and the hex 7 field bits are forced to assume the proper packed decimal sign code values.

When processing pure binary numbers, the output corrector 50 is set so as not to modify such numbers. In such case, the output corrector 50 simply takes the binary number appearing at the output of adder 20 and passes it on to the output register 53.

With one exception, the resultant multidigit binary coded decimal number supplied to the output register 53 is in true magnitude form. The exception occurs when the arithmetic operation being performed by the arithmetic unit 10 is subtraction and the numerical value of the B side input operand in B register 31 is larger in magnitude than the numerical value of the A side input operand in A register 21. In such case, the resultant number supplied to the output register 53 is in complement form. Such number can be converted to true form by performing a recomplementation operation.

The arithmetic unit 10 includes the necessary circuitry for performing such recomplement operation. In particular, the resultant number in output register 53 can be recomplemented by channeling same back through the B side of the arithmetic unit 10 and subtracting such number from an A side input value equal to zero. In the recomplement operation, the executed arithmetic operation is always subtraction regardless of the sign of the number in register 53 to be recomplemented. Also, the correct polarity sign for the output number produced by such recomplement operation is always opposite in polarity value to the polarity of the original output number before it was recomplemented. In other words, an output number in complement form is converted to true form by using the arithmetic unit 10 to complement same and by reversing the polarity value in the polarity sign field.

In order to accomplish the recomplementing of the multidigit binary coded decimal number in the output register 53, the arithmetic unit 10 includes a 32-conductor data bus 61, a set of 32 data flow gates 62 (one for each data bus conductor) and a 32-conductor data bus 63 for supplying the number in the output register 53 back to the B side input register 31. This transfer back to the B register 31 occurs when the data flow gates 62 are enabled or rendered conductive by an external transfer control signal XFER ZB on a control line 64. From the B register 31, the number to be recomplemented is supplied by way of the complement and B input modifier 33 to the right side input of the binary adder 20. The unit 33 handles the decimal number to be recomplemented in the same manner as any other decimal number except that such number is always complemented by unit 33 when doing a recomplement operation. At the same time, the A input modifier 23 is operated to supply a binary sequence of all zeros to the left side input of the binary adder 20. The binary adder 20 adds the complemented number to the zeros and supplies the resulting output number to the output corrector 50. The output corrector 50 handles the recomplemented decimal number in the same manner as described above for other decimal numbers except for the sign field in the recomplemented number. In this case, the sign handler 40 supplies to the output corrector 50 an appropriate sign control signal for setting the sign field in the recomplemented number to indicate a polarity value opposite to the polarity value it had when it was supplied back to the B register 31 at the start of the recomplement operation. The recomplemented number supplied to the output register 53 is the desired number in true magnitude form.

The need for a recomplement operation is determined by means of complement detector circuitry 65 which operates to determine whether the output number supplied to register 53 is in complement form. This determination is made by noting the presence or absence of a $C\phi$ carry-out when performing a decimal subtraction operation. The $C\phi$ carry-out represents the final carry-out for the binary adder 20 as a whole and is supplied to the complement detector 65 by way of conductor 66. If there is a $C\phi$ carry-out ($C\phi = 1$) when performing a decimal subtraction operation, then the numerical data supplied to the output register 53 is in true magnitude form and no recomplement is necessary. If, on the other hand, there is no $C\phi$ carry-out ($C\phi = 0$) when performing a decimal subtraction operation, then the number supplied to the output register 53 is in complement form and a recomplement operation is required. The results of the complement detector determination are indicated by a binary output signal CD appearing on a complement detector output line 67.

As previously indicated, the various functional data flow units such as registers 21, 31 and 53, modifiers and correctors 23, 33 and 50 and the binary adder 20 are assumed to have a data flow width of four bytes (32 bits). This assumption was made for sake of example only. Such units could just as well have been constructed to have data flow widths of five or six or seven or eight or more bytes. The features of the present invention work equally as well, if not better, with these wider data flow widths. It is noted that, in terms of bits, the data flow width should be an exact multiple of a byte or character because of the added difficulty of working with partial bytes and because most present day data processors are not constructed to handle partial bytes.

The decimal operands to be added or subtracted are frequently larger than the basic data flow width of the arithmetic unit 10. This is true whether the basic width be four bytes (32 bits) as in the assumed example or some reasonably larger value such as eight bytes (64 bits). In such cases of larger than hardware width operands, more than one pass through the arithmetic unit 10 is required to complete the arithmetic operation. For example, if the operands were twice as large (eight bytes) as the basic hardware width (four bytes) of the arithmetic unit 10, the lower halves of the two input operands would be added or subtracted on a first pass through the arithmetic unit 10 and the upper halves would be added or subtracted on a second pass through the arithmetic unit 10. During the second or other subsequent pass through the arithmetic unit 10, some things are done a bit differently in the arithmetic unit 10. For one thing, any carry-out propagated out of the adder 20 (carry-out $C\phi$) during the first pass with the lower order halves of the operands must be remembered and used as a carry-in to the adder 20 (carry-in $C_{in}$) during the second pass with the higher order halves of the operands.

In the present embodiment, this is accomplished by means of a status latch 70, a conductor 71 and transfer switch circuitry 72, the output of the latter being connected to the carry-in line 73 for the adder 20. During the first pass, the switch circuitry 72 connects the adder carry-in line 73 to the add/subtract control signal line 42 for enabling a +1 carry-in when the arithmetic unit 10 is performing a subtraction operation. This is the customary +1 carry-in when one of the operands is complemented. During the second pass for larger than hardware width operands, the switch 72 instead connects the carry-in line 73 to the output line 71 from the status latch 70. This enables the $C\phi$ carry-out for the first pass to be used as the carry-in for the second pass. If a third pass is required, this same connection enables the $C\phi$ carry-out for the second pass to be used as the carry-in for the third pass. The status latch 70 provides the mechanism for remembering the carry-out from the previous pass so that it is available for use during the subsequent pass. The switching action in the switch circuit 72 is controlled by the first pass status signal on control line 28.

A second item which needs to be taken into account when making subsequent passes for larger than hardware width decimal operands relates to the fact that the sign fields are located only on the lowest byte for each operand and hence are available only during the first pass through the arithmetic unit 10. As a consequence, the arithmetic operation initiated by the add/subtract control signal produced by the sign handler 40 must be remembered for use on subsequent passes through the arithmetic unit 10. This is accomplished by circuitry located within the sign handler 40 and to be discussed hereinafter. In addition to the foregoing, certain more or less minor changes must be made in the operations performed by the A input modifier 23, the B input modifier 33 and the output corrector 50 when making subsequent passes for larger than hardware width decimal operands. These changes relate to the fact that there are no sign fields during these subsequent passes. Thus, the operation of these units is adjusted during subsequent passes so that the hardware locations used by the sign fields on the first pass are changed to provide either a zone field or a digit field type of operation, as the case may be, on subsequent passes.

The novel features of the present invention considerably increase the speed of performing decimal operations. In particular, if the output result of a decimal operation is in true form (as opposed to complement form), then the speed of the decimal arithmetic is comparable to the speed of the corresponding binary arithmetic for operands of comparable width. If the decimal operation produces a result in complement form, then it would have to be recomplemented and thus be one operation slower than the binary operation for which complement results are valid and an acceptable output. Furthermore, when considering the overall input-processing-output throughput speed, such speed for a decimal operation will in many cases be considerably greater than the corresponding throughput speed for a binary operation. This is because binary operations require that the incoming numerical data be converted to a packed format and then to a pure binary format before performing the arithmetic operation and that the results be converted to a packed decimal format and then to a zoned decimal format before being sent to an output device.

CONTROL UNIT — FIG. 3

Figure 3:
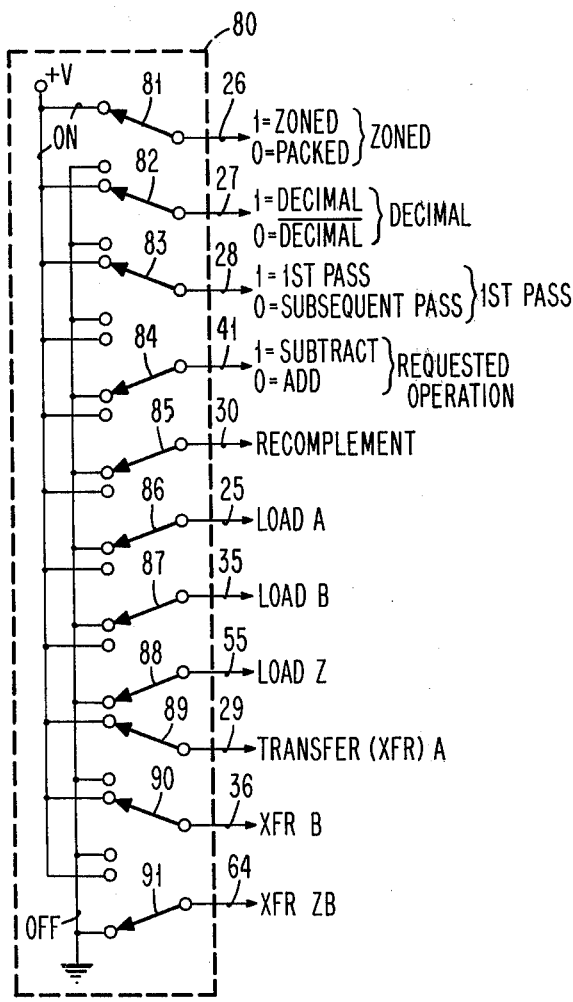
FIG. 3 represents in a symbolic manner a portion of a control unit for developing various external control signals which are supplied to the arithmetic unit of FIG. 1.

Referring to FIG. 3, there is shown in a symbolic manner a portion of a control unit 80 for developing the various external status signals, selection signals and control signals which are supplied to the arithmetic unit 10 of FIG. 1. The control unit portion 80 shown in FIG. 3 includes a set of eleven two-position ("binary") switches 81–91 which individually control the signal states on the different ones of the control lines 26, 27, 28, 41, 30, 25, 35, 55, 29, 36 and 64. The convention used in FIG. 3 and elsewhere herein is to apply to the control line the name of the quantity or status or desired action which is represented by the occurrence of a binary one level on such control line. Thus, the control line 26 is labeled "zoned" to denote that the binary one level on such control line 26 denotes a zoned format status. With this in mind, the exemplary settings of the various switches 81-91 shown in FIG. 3 represent the switch positions for requesting the performance of an addition operation (switch 84 = add) on the lower order four bytes (switch 83 = first pass) of two zoned (switch 81 = zoned) decimal (switch 82 = decimal) operands. The operation proper is initiated when the "transfer A" and "transfer B" signals (switches 89 and 90) are set to the binary one ("on") positions.

In a modern day data processor, the switches 81-91 would, of course, take the form of high speed binary circuits which can individually provide either a binary one level or a binary zero level output, depending upon the particular operation to be performed at any given moment. For a data processor of the microprogrammed type, switches 81-91 denote individual stages in the control register which receives the microinstructions or control words from the control storage portion of such data processor. For a nonmicroprogrammed type of data processor, switches 81-91 represent the output stages of binary control circuits in the control section of such data processor.

Figure 4:
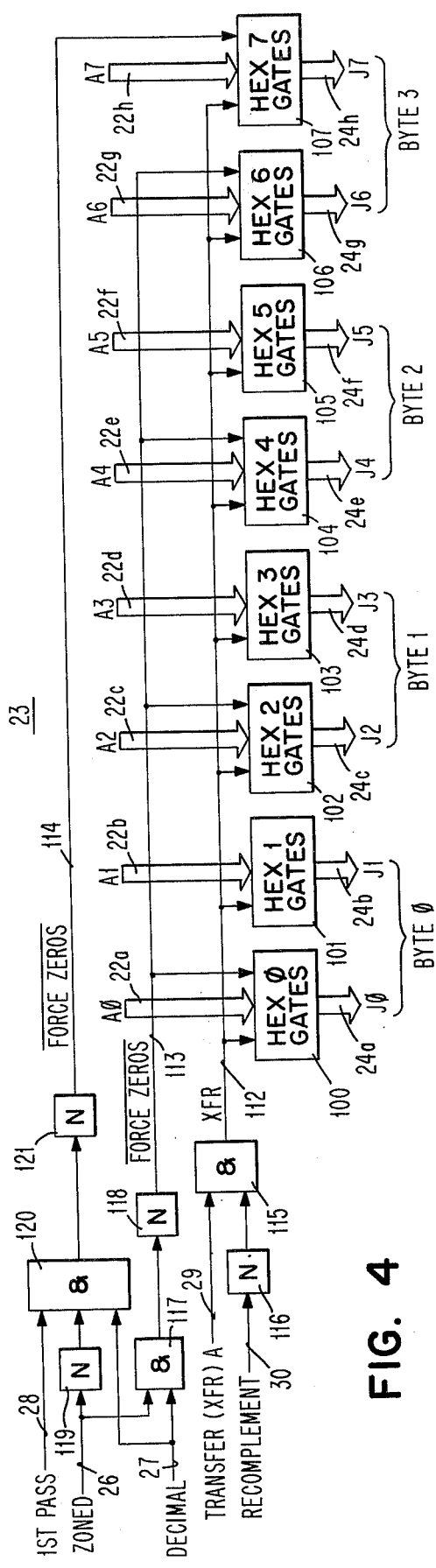
FIG. 4 is a logic circuit diagram showing a representative form of construction for the A input modifier of FIG. 1.
Figure 5:
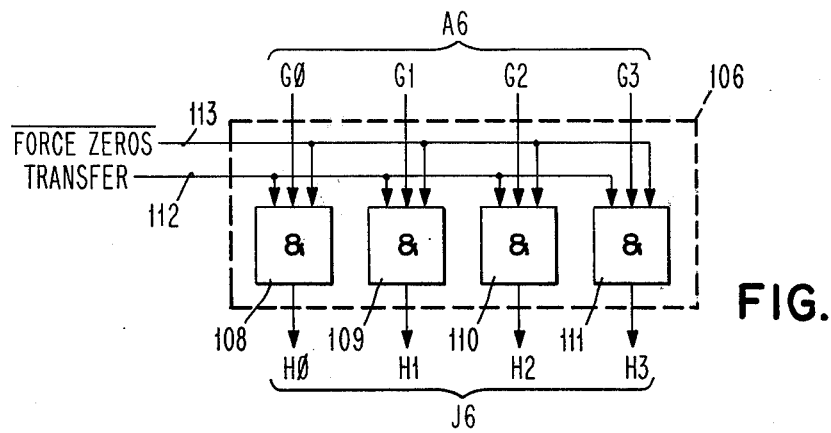
FIG. 5 is a logic circuit diagram showing a representative form of internal construction for the "hex 6" gates in the A input modifier of FIG. 4.

A Input Modifier — FIGS. 4 and 5

FIG. 4 shows a representative form of internal construction for the A input modifier 23 of FIG. 1. This FIG. 4 embodiment for the A input modifier 23 includes a set of eight four-bit gate units 100-107 for individually handling different ones of the eight hex fields in the A side input operand in the A register 21. The eight 4-bit hex fields received from the A register 21 are designated as A$\phi$-A7, while the eight 4-bit hex fields sent to the left side input of the binary adder 20 are identified as j$\phi$-J7. The eight four-conductor data buses 22a-22h make up the 32-conductor data bus 22 of FIG. 1. Similarly, the eight four-conductor data buses 24a-24h make up the 32-conductor data bus 24 of FIG. 1.

A representative form of internal construction for a typical one of the four-stage gate units, namely, the gate unit 106, is shown in FIG. 5. Such gate unit 106 includes four AND circuits or AND gates 108-111 which individually receive different ones of the 4 bit lines or conductors G$\phi$-G3 which make up the A6 hex field. The AND circuit output conductors for the different bits are designated H$\phi$-H3, these bits forming the J6 hex field which is sent to the adder 20. The operation of these AND gates 108-111 is controlled by a pair of control lines 112 and 113. Assuming for the moment that control line 113 is at the binary one level, then the data bits on the G$\phi$-G3 lines are transferred without modification to the H$\phi$-H3 lines by setting the transfer control line 112 to the binary one level. The other control line 113 is used to force four zeros on the output bit line H$\phi$-H3. This is accomplished by setting the signal level on this "force zeros" control line 113 to a binary value of zero. This disables the AND gates 108-111 and forces their outputs to remain at the zero level.

Each of the other even numbered gate units, namely, gate units 100, 102 and 104, are of exactly the same construction as the gate unit 106 shown in FIG. 5. The odd numbered gate units 101, 103 and 105 are also of the same construction except that the zero forcing control line 113 is omitted. The rightmost gate unit 107 is of the same construction as gate unit 106 except that the zero forcing control line is numbered 114 and receives its signal from a different place than the zero forcing control line 113.

As indicated in FIG. 4, the "transfer" control line 112 is controlled by the "transfer A" and "recomplement" control signals on control lines 29 and 30. The zero forcing control line 113 is controlled by the "zoned" and "decimal" status signals on control lines 26 and 27. The second zero forcing control lines 114 is controlled by the "zoned", "decimal" and "first pass" status signals on control lines 26, 27 and 28.

When handling pure binary numbers (decimal = 0), the zero forcing control lines 113 and 114 remain at the binary one level and the transfer A signal on control line 29 is effective to cause a transfer without modification of the A$\phi$-A7 data bits to the left side input of the binary adder 20. This assumes that the recomplement signal on line 30 is zero, in which case an AND circuit 115 drives the transfer control line 112 to the binary one level when the transfer A signal is at the transfer initiating one level. During a recomplement operation, the recomplement signal on line 30 is set to the one level. This is inverted to a zero level by a NOT circuit 116. This disables the AND circuit 115 and, hence, all of the gate units 100-107. This forces all of the data bit output lines J$\phi$-J7 to remain at the binary zero level, which is the desired result when performing a recomplement operation.

When handling zoned decimal numerical data, both the "decimal" status signal and the "zoned" status signal are at the binary one level. This produces a binary one at the output of an AND circuit 117 which, through the inverting action of a NOT circuit 118, forces the control line 113 to the zero level. This disables the even numbered gate units 100, 102, 104 and 106 which handle the zone and sign field portions of a zoned decimal operand. This forces each of the output bit lines for the hex $\phi$hex 2, hex 4 and hex 6 field positions to remain at the binary zero level. Thus, when a data transfer is initiated by setting the transfer A signal to the one level, only the data bits for the hex 1, hex 3, hex 5 and hex 7 fields, these being the zoned decimal digit fields, are passed on to the left side input of the binary adder 20 in an unmodified manner. During such data transfer, the data bits for the zoned decimal zone and sign fields (hex fields $\phi$2, 4 and 6) are forced to remain at the binary zero level. This constitutes the desired preconditioning of the A side input operand for the case of zoned decimal operands. No distinction is made between first and subsequent passes for larger than four byte operands because the first pass sign field position becomes a zone field position on subsequent passes.

When handling decimal operands in a packed format, the zoned decimal zero forcing control line 113 remains at the binary one level because the zoned status signal on control line 26 is at the zero level, thus disabling the AND gate 117. In the packed decimal case, the zero forcing is done by the control line 114 which controls only the hex 7 gate unit 107. This control line 114 is set to the zero level only if the status signals on control lines 26, 27 and 28 indicate "packed" and "decimal" and "first pass". For any other combination of these three factors, the control line 114 is held at the binary one level. This logic is accomplished by NOT circuit 119, AND circuit 120 and NOT circuit 121. Thus, when handling packed decimal operands, all data bits are supplied to the left side input of the adder 20 in an unmodified manner except that the hex 7 field bits, which constitute the packed decimal sign field bits during a first pass, are forced to zero during such first pass. This hex 7 forcing to zero is not done on subsequent passes for larger than hardware width operands because only the lowest order hex field in such larger than hardware width operands is a sign field.

COMPLEMENT AND B INPUT MODIFIER — FIGS. 6 AND 7

Figure 6:
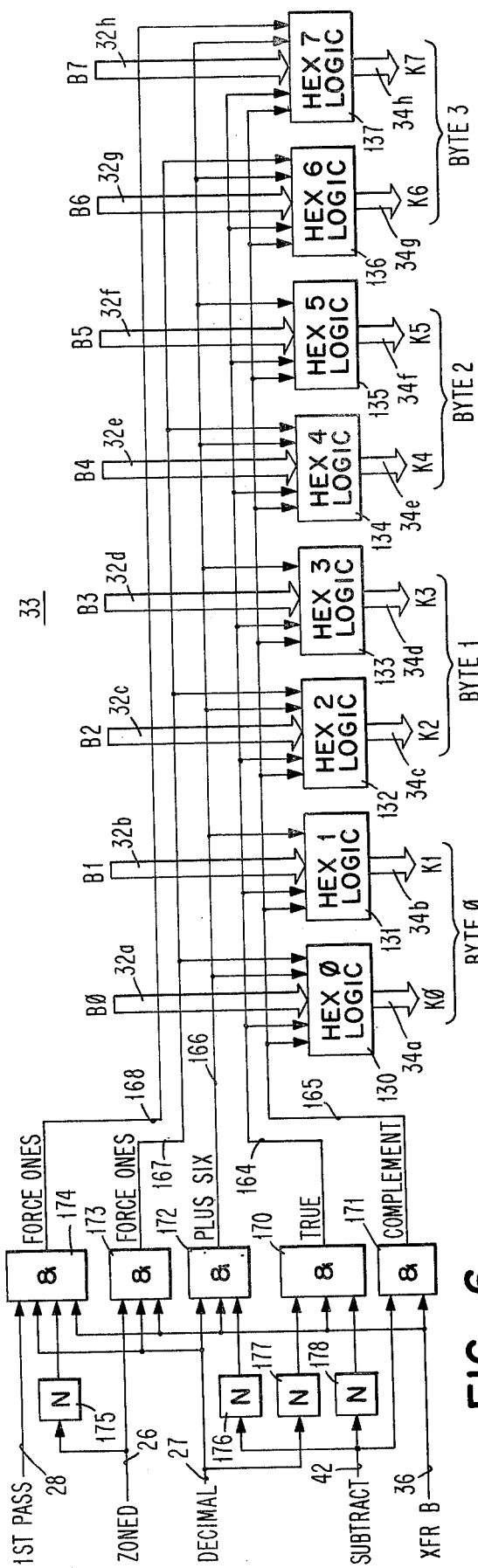
FIG. 6 is a logic circuit diagram showing a representative form of construction for the complement and B input modifier circuitry of FIG. 1.

FIG. 6 shows a representative form of internal construction for the complement and B input modifier 33 of FIG. 1. This FIG. 6 embodiment for the unit 33 includes a set of eight four-stage logic units 130–137 for individually handling different ones of the eight hex fields in the B side input operand in the B register 31. The eight four-bit hex fields received from the B register 31 are designated as B$\phi$-B7, while the eight four-bit hex fields sent to the right side input of the binary adder 20 are identified as K$\phi$-K7. For the complement and B input modifier 33, it is desired to use the data bits in the B register 31 in both their true and complement forms. Thus, for each bit position in the B register 31, two output conductors run to the unit 33, one carrying a true replica of the data bit and the other carrying a complement or logically inverted replica of the data bit. Thus, the eight data buses 32a-32h, which make up the data bus 32 of FIG. 1, each includes a set of eight conductors, four for the true signals and four for the complement signals. Each of the eight data buses 34a-34h, which make up the data bus 34 of FIG. 1 and which run to the right side input of the adder 20, includes a set of four conductors.

Figure 7:
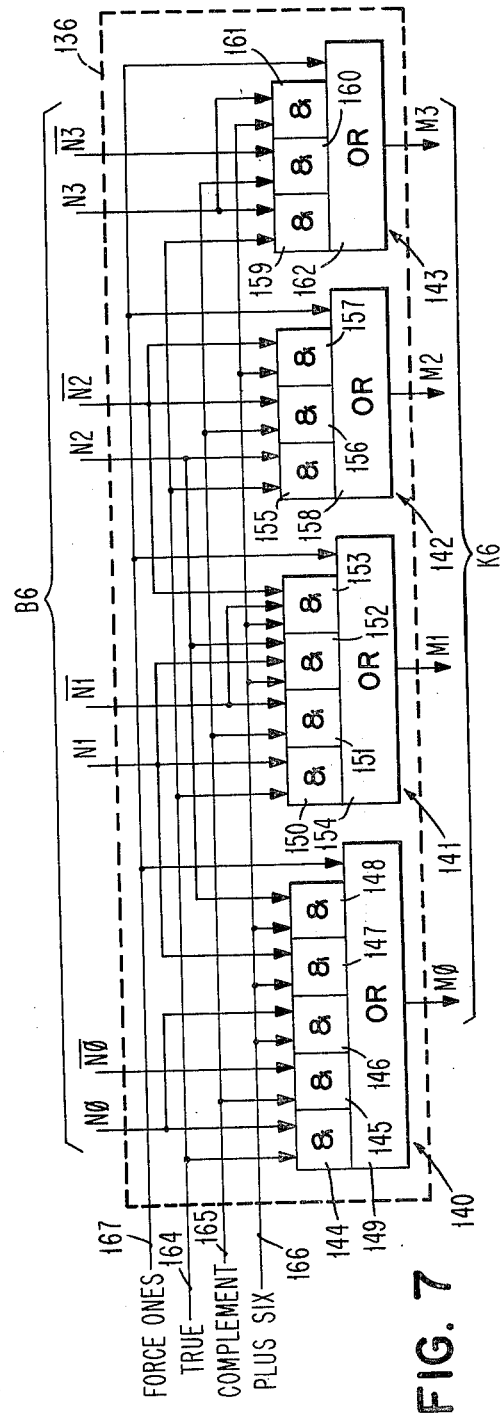
FIG. 7 is a logic circuit diagram showing a representative form of internal construction for the "hex 6" logic unit of FIG. 6.

A representative form of internal construction for a typical one of the four-stage logic units, namely, the hex six logic unit 136, is shown in FIG. 7. As there shown, such hex six logic unit 136 includes four separate stages 140–143 which individually produce on their output lines different ones of the bit signals M$\phi$-M3 which make up the K6 hex field supplied to the right side input of the binary adder 20. The first and higher order bit position stage 140 includes five two-input AND circuits or AND gates 144–148 having their outputs individually connected to different inputs of an OR circuit 149. The second bit position stage 141 includes four multiple input AND circuits or AND gates 150–153 which have their output lines individually connected to different inputs of an OR circuit 154. The third bit position stage 142 includes three two-input AND circuits or AND gates 155–157 having their outputs individually connected to different inputs of an OR circuit 158. The fourth and lowest order bit position stage 143 includes three two-input AND circuits or AND gates 159–161 having their outputs individually connected to different inputs of an OR circuit 162.

The various AND gates in the stages 140–143 are controlled by different ones of a set of four control lines 164–167. As indicated by the names applied to these control lines 164–167, the logic unit 136 is capable of selectively providing any one of the following four functions:

a. true (or unmodified) data transfer
b. complement data transfer
c. plus six (digit value +6) data transfer
d. force four ones Only one of the first three control lines 164–166 can be set to the binary one level at any given moment, the other two being at the binary zero level at such moment. The fourth control line 167 provides an override type action such that when it is set to the binary one level, it overrides the actions of the other three control lines 164–166 and forces four ones to appear on the four M$\phi$-M3 output lines.

When the "true" control line 164 is set to the binary one level, the AND gates 144, 150, 155 and 159 are placed in an enabled condition and the remainder of the AND gates are in a disabled condition. Assuming that the "force ones" line 167 is at the zero level, this enables the true form bits N$\phi$-N3 from the B register 31 to be passed on without modification to the respective ones of the M$\phi$-M3 output bit lines which run to the adder 20. Thus, in this mode, the M$\phi$-M3 bit signals constitute a true replica of the hex six field in the B register 31.

When the "complement" control line 165 is set to the binary one level, AND gates 145, 151, 156 and 160 are placed in an enabled condition, the remainder of the AND gates being disabled. Assuming line 167 to be at the zero level, this enables the complement form bits N$\phi$-N3 from the B register 31 to be passed on through to the M$\phi$-M3 output bit lines. In this mode, therefore, the K6 hex field (bits M$\phi$-M3) supplied to the right side input of the adder 20 constitutes a complement form replica or complement of the hex six field in the B register 31.

When the "plus six" control line 166 is set to the binary one level, the AND gates 146–148, 152–153, 157 and 161 are placed in an enabled condition, the remainder of the AND gates being disabled. Assuming line 167 to be at the zero level, these enabled AND gates 146–148, 152–153, 157 and 161 operate to increase the value of the digit represented by the coding of the B6 hex field by a factor of six, provided that such digit value is in the 0–9 range. The necessary logic for increasing the binary coded decimal digit value by six is as follows:

$$M\phi = N\phi + N1 + N2 \qquad (1)$$

$$M1 = N1.\overline{N2} + \overline{N1}.N2 \qquad (2)$$

$$M2 = \overline{N2} \qquad (3)$$

$$M3 = N3 \qquad (4)$$

These are logical expressions wherein the plus (+) sign denotes the logical OR function and the dot (.) symbol denotes the logical AND function. The overbar, of course, denotes "complement" or "logical inversion."

AND circuits 146–148 together with the OR circuit 149 of the first stage 140 perform the logic indicated by equation (1). AND circuits 152 and 153 and OR circuit 154 in the second stage 141 perform the logic indicated by equation (2). AND circuit 157 and OR circuit 158 in the third stage 142 perform the logic indicated by equation (3). In this case, the M2 output is simply the one's complement or inverted replica of the N2 bit in the B register 31. AND circuit 161 and OR circuit 162 in the fourth stage 143 perform the logic indicated by equation (4). In this case, the M3 output bit is the same as the N3 bit in the B register 31, the AND circuit 161 functioning merely as a control gate.

As mentioned, this logic circuitry correctly performs the plus six function only when the binary coding of the B6 bits indicates a number value in the 0–9 range. This is acceptable because the plus six function is used only for decimal digits which, of course, can only have values of zero through nine.

When the "force ones" control line 167 is set to the binary one level, each of the four M$\phi$-M3 output bit lines is forced to the binary one level. This is because the binary one level on the control line 167 is supplied directly to each of the four OR circuits 149, 154, 158 and 162. The fact that one of the AND circuits may at the same time by supplying a zero to the OR circuit doesn't change the result. The binary one supplied by control line 167 keeps the OR circuit output line at the binary one level regardless of the status of the other inputs to the OR circuit.

Returning to FIG. 6, which shows all of the hex field logic units 130–137, each of the other even-numbered logic units, namely, 130, 132 and 134, are of exactly the same construction as that shown in FIG. 7 for unit 136. The odd-numbered logic units 131, 133 and 135 are also of the same construction as shown in FIG. 7 except that the "force ones" control line 167 is omitted. These logic units are, of course, not required to handle either zone or sign fields and, hence, the "force ones" function is not needed. The lowest order hex logic unit 137 is of the same construction as shown in FIG. 7 except that the "force ones" control line runs to a different signal source and, hence, such control line is instead numbered as control line 168.

As shown in FIG. 6, the logic unit control lines 164–168 individually run to the output sides of different ones of AND circuits 170–174. The status of the signal levels on these logic unit control lines 164–168 is determined by the status of the signals on the external control lines 26, 27, 28, 36 and 42 which are connected to the inputs of different ones of the AND circuits 170–174, in some cases by way of one of a set of NOT circuits 175–178.

A transfer of data from the B register 31 to the right side input of the binary adder 20 is initiated by setting the transfer B control line 36 to the binary one level. This control line 36 runs to each of the AND circuits 170–174. Thus, when the transfer B control line 36 is set to the binary one level, one and sometimes two of the logic unit control lines 164–168 will be set to the transfer initiating binary one level.

To enable the arithmetic unit 10 to perform binary addition, the decimal control line 27 is set to the binary zero level. This disables AND circuits 172–174. At the same time, the add/subtract control signal from the sign handler 40 (control line 42) is at the "add" indicating zero level. This disables the complement line AND circuit 171. Thus, the AND circuit 170 connected to the "true" control line 164 is the only one that can be activated by the transfer B signal. When such transfer B signal goes to the one level, all 32 bits in the B register 31 are transferred in an unmodified manner (true form) to the right side input of the adder 20.

When performing binary subtraction, the AND circuits 172–174 are again disabled by the zero level on the decimal control line 27. The add/subtract control signal on control line 42 is, however, at the subtract indicating binary one level. This disables the true control gate 170 (via NOT circuit 178) and places the complement control gate 171 in an enabled condition. Thus, when the transfer B signal goes to the one level, the 32 data bits supplied to the right side input of the adder 20 represent the one's complement of the 32 data bits in the B register 31.

Whenever either zoned decimal addition or zoned decimal subtraction are to be performed, the zoned and decimal signals on control lines 26 and 27 are at the binary one level. This places the zoned decimal "force ones" control gate 173 in an enabled condition and disables the packed decimal "force ones" control gate 174 via NOT circuit 175. Thus, when the transfer B signal goes to the one level, the "force ones" control line 167 goes to the one level to force the output lines from the even-numbered hex logic units 130, 132, 134 and 136 to the binary one level. This forces each bit in the zone and sign fields to assume a binary value of one. At the same time, either the "complement" control line 165 or the "plus six" control line 166 is placed at the binary one level, depending on whether the operation to be performed is subtraction or addition. The "true" control gate 170 is disabled by way of NOT circuit 177.

If the operation is zoned decimal subtraction, then the subtract line 42 is at the one level and the "complement" control gate 171 is activated (when XFER B = 1) to place the complement control line 165 at the one level. This enables the odd-numbered hex logic units 131, 133, 135 and 137 which handle the digit fields to supply the digit field data bits to the right side input of the adder 20 in complement form.

If, on the other hand, the zoned decimal operation is addition, then the subtract control line 42 is at the binary zero level. This disables the "complement" control gate 171 and places the "plus six" control gate 172 in an enabled condition, this being accomplished by way of NOT circuit 176. This enables the "transfer B" signal to place the plus six control line 166 at the binary one level. This adds a numerical value of six to the digit value in each of the odd-numbered hex fields as such hex fields flow through the odd-numbered logic units 131, 133, 135 and 137. As previously indicated, this takes into account the difference between the base ten and the base sixteen number systems and enables the proper generation of digit carries when the two input operands A and B are added together inside the adder 20.

When handling packed decimal operands, the zoned status signal on control line 26 is set to the binary zero level. This disables the zoned decimal "force ones" control gate 173 and places the packed decimal "force ones" control gate 174 in an enabled condition, provided the first pass status signal on control line 28 is at the first pass indicative binary one level. In other words, for packed decimal data, the "force ones" control line 168 is used in place of the "force ones" control line 167. As seen in FIG. 6, this packed decimal "force ones" control line 168 runs only to the lowest order hex logic unit 137. If the signal on control line 28 indicates a first pass status, then this control line 168 forces each bit in the packed decimal sign field to assume a binary value of one. On a subsequent pass for a larger than hardware width packed decimal operand, the "force ones" control line 168 remains at the zero level to take into account the fact that there is no sign field present in the data fields supplied to the unit 33 during a subsequent pass. Thus, the control line 168 forces a 1111 output from the hex seven logic unit 137 only if the format is "packed" and "decimal" and the status is "first pass". When handling packed decimal operands, there is never any forcing of ones for the first seven hex logic units 130–136. There is a forcing of ones only for the lowest order hex logic unit 137 and only during the first pass for any given operand.

For a packed decimal addition operation, the "plus six" control gate 172 is also energized to place the "plus six" control line 166 at the binary one level. This adds six to the digit value in each of the first seven hex logic units 130–136. It also adds six to the digit value in the eighth hex logic unit 137 during a subsequent pass with a larger than hardware width operand. When performing packed decimal subtraction, the "plus six" control gate 172 is disabled and the "complement" control gate 171 is instead placed in an enabled condition. This causes the complement control line 165 to be placed at the binary one level by the "transfer B" signal and enables the first seven hex logic units 130-136 to pass the complement data bits to the right side input of the adder 20. It also enables the eighth hex logic unit 137 to pass the complement data bits to the adder 20 during a subsequent pass operation.

SIGN HANDLER — FIGS. 8 AND 9

Figure 8:
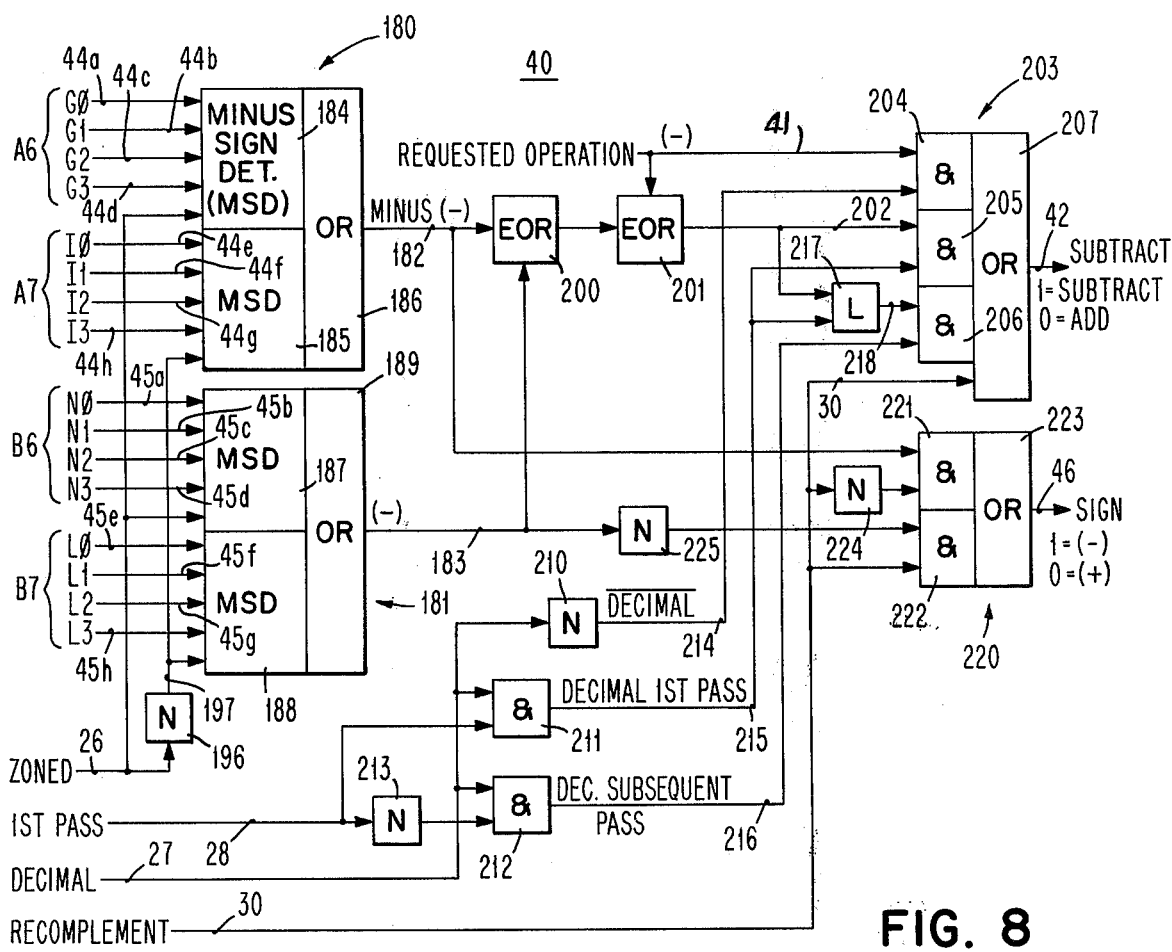
FIG. 8 is a logic circuit diagram showing a representative form of construction for the sign handler unit of FIG. 1.

FIG. 8 shows a representative form of internal construction for the sign handler 40 of FIG. 1. For convenience of explanation, this FIG. 8 embodiment for the sign handler 40 can be thought of as having two major operating portions. A first portion includes circuitry responsive to the sign fields in the A side input and B side input operands in A and B registers 21 and 31 and to the external "requested operation" selection signal on control line 41 for developing the add/subtract control signal on output line 42, which control signal is used to control the plus six/complement action inside the complement and B input modifier unit 33. The second major operating portion includes sign control circuitry responsive to the sign field in at least one of the A side and B side input operands for producing the sign control signal on output line 46, which sign control signal is used for setting the sign field bits in the output corrector 50 to represent the proper sign code for the resultant or output operand.

Considering first the circuitry for generating the add/subtract control signal on output conductor 42, it is initially noted that there are various possible decimal sign field codes, these being set forth in Table II above. As seen in Table II, there are four possible plus (+) codes and two possible minus (−) codes. All six of these sign codes are valid sign codes for input decimal operands. With this in mind, the add/subtract control signal circuitry of FIG. 8 includes first and second sign code detector circuitry 180 and 181 for producing on conductors 182 and 183, respectively, first and second polarity indicating signals respectively representing the sign polarities of the two input operands in the A and B registers 21 and 31. The sign code detector 180 for the A side input operand in A register 21 includes a first minus sign detector 184 which is connected to the A6 or hex six bit positions in the A register 21 by means of conductors 44a–44d. The A operand sign code detector 180 further includes a second minus sign detector 185 which is connected to the A7 or hex seven bit positions in the A register 21 by means of conductors 44e–44h. All eight of these conductors 44a–44h make up the eight-conductor data bus 44 of FIG. 1. The output of each of minus sign detectors 184 and 185 is connected to a different input of an OR circuit 186 which is also included in the A operand sign code detector 180.

The second sign code detector 181 is for the B side input operand in the B register 31 and includes a first minus sign detector 187 which is connected to the B6 or hex six bit positions in the B register 31 by means of conductors 45a–45d. The B operand sign code detector 181 further includes a second minus sign detector 188 which is connected to the B7 or hex seven bit positions in the B register 31 by means of conductors 45e–45h. All eight of these conductors 45a–45h make up the eight-conductor data bus 45 of FIG. 1. The outputs of the minus sign detectors 187 and 188 are connected to different inputs of an OR circuit 189, which OR circuit is also included in the B operand sign code detector 181.

Figure 9:
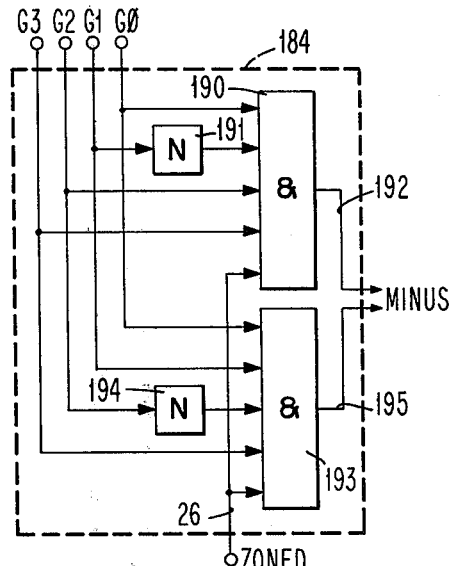
FIG. 9 is a logic circuit diagram showing a representative form of internal construction for the minus sign detectors used in the FIG. 8 sign handler circuitry.

A representative form of internal construction for the minus sign detector 184 is shown in FIG. 9. As there seen, the minus sign detector 184 includes first logic circuitry comprised of an AND gate 190 and a NOT circuit 191 for detecting the occurrence of the 1011 minus sign code. When such 1011 sign code occurs (G1 = 0), AND circuit 190 produces a binary one level on its output line 192, provided the zoned status signal control line 26 is at the binary one level. The minus sign detector 184 further includes logic circuitry comprised of an AND circuit 193 and a NOT circuit 194 for detecting the occurrence of the 1101 minus sign code. When such 1101 code occurs (G2 = 0), AND circuit 193 produces a binary one level on its output line 195, provided the zoned status signal control line 26 is at the binary one level. The two AND circuit lines 192 and 195 are connected to two different inputs of the OR circuit 186 of FIG. 8.

Each of the other minus sign detectors 185, 187 and 188 of FIG. 8 are of the same internal construction as shown in FIG. 9 for the case of the minus sign detector 184.

If zoned operands are being handled, then the zoned status signal on control line 26 is at the binary one level. This enables the minus sign detectors 184 and 187 for purposes of examining the zoned decimal sign field bits in the hex six field position in each of the two input operands A and B. At the same time, this zoned status signal is supplied to a NOT circuit 196 to produce a binary zero level on line 197. This disables the minus sign detectors 185 and 188 for the packed decimal sign fields in the hex seven field positions. If, on the other hand, packed decimal numbers are being handled, then the zoned status signal on control line 26 is at the binary zero level and the situation is reversed. In other words, the zoned decimal minus sign detectors 184 and 187 are disabled and the packed decimal minus sign detectors 185 and 188 are enabled.

There appears on the OR circuit output line 182 a binary signal representing the polarity indicated by the sign field code of the A side input operand in A register 21. At the same time, there appears on the OR circuit output line 183 a binary signal representing the polarity indicated by the sign code of the B side input operand in the B register 31. In both cases, a binary one level represents a minus or negative sign and a binary zero level represents a plus or positive sign. At the same time, the "requested operation" selection signal on external control line 41 indicates whether an addition or subtraction is being requested by the operator or program, as the case may be. A binary one level on control line 41 represents a request for a minus or subtraction operation, while a binary zero level represents a request for a plus or addition operation.

As indicated above, the arithmetic operation actually executed by the arithmetic unit 10 should not necessarily be the requested operation. For example, if an addition operation is requested and operand A is positive while operand B is negative, then the arithmetic unit 10 should actually execute a subtraction operation to obtain a correct result in true magnitude form. Conversely, if a subtract operation is requested and the two input operands are of different signs, then the arithmetic unit 10 should perform an add operation to obtain the correct output. The necessary logic to be performed in order to determine which arithmetic operation should actually be executed is set forth in Table IV shown hereinabove.

In order to execute the logic set forth in Table IV, the sign handling circuitry 40 includes logic circuitry responsive to the first and second polarity-indicating signals on OR circuit output lines 182 and 183 and to the polarity-indicating selection signal on control line 41 for producing an add signal when none or an even number of these three polarity-indicating signals is negative and for producing a subtract signal when an odd number of these three polarity-indicating signals is negative. This is the meaning of the logic set forth in Table IV.

The necessary logic circuitry for this function is comprised of a pair of EXCLUSIVE OR circuits 200 and 201 for exclusively ORing the three polarity-indicating signals on conductors 41, 182 and 183 for producing on an output line 202 the add and subtract signals which control or determine the arithmetic operation to be executed. The signal on conductor 202 is a binary signal which assumes a binary one level when the operation to be executed is minus or subtraction and a binary zero level when the operation to be executed is plus or addition.

The EXCLUSIVE OR circuit 200 produces a one level output when either one or the other but not both of its inputs is at the binary one level. Thus, its output is at the one level if an odd number of its inputs are at the one level. Similarly, the second EXCLUSIVE OR circuit 201 will produce a one level output if one or the other but not both of its inputs are at the binary one level. This again denotes that an odd number of its inputs are at the binary one level. Thus, the overall logic for both of the EXCLUSIVE OR circuits 200 and 201 is that the final output on conductor 202 will be at the binary one level if and only if an odd number of the three input signals is at the minus-indicating one level.

The add/subtract control signal on conductor 202 is supplied by way of a logical signal switching mechanism 203 to the sign handler output line 42, provided the zoned, decimal, first pass and recomplement status signals on control lines 26, 27, 28 and 30, respectively, have the appropriate status values. Assuming this to be case, the add/subtract control signal on output line 42 is supplied to the complement and B input modifiers 33 to control the true/complement/plus six action therein and hence to control the arithmetic operation performed by the arithmetic unit 10. A subtract status for this control signal on conductor 42 causes the unit 33 to complement the B side input operand. An add status for this control signal disables the complementing action and instead causes either the "true" or "plus six" function to be performed by the unit 33, the latter depending on whether the operands are binary or decimal.

The signal switching or signal selecting mechanism 203 includes AND circuits 204, 205 and 206, each having their output connected to a different input of an OR circuit 207, the output of OR circuit 207 being connected to the add/subtract control signal line 42. The signal selecting AND circuits 204–206 are controlled by the decimal and first pass status signals on external control lines 27 and 28. These status signals are supplied to a NOT circuit 210, and AND circuit 211 and an AND circuit 212, the first pass signal being supplied to the second input of the latter by way of a NOT circuit 213. These circuits 210–213 form a decoder of sorts to control the status of the signal levels on the three lines 214, 215 and 216 such that only one of these three lines will be at the binary one level at any given moment. If the decimal status is "not decimal," then control line 27 is at the zero level to place the line 214 at the one level. This enables the signal selecting AND circuit 204 to enable the external selection signal on control line 41 to be passed on to the add/subtract control line 42. The other two AND circuits 205 and 206 are, in this case, disabled. This provides for external control of the arithmetic operation when decimal operands are not being processed.

When the decimal status is "decimal" and the first pass status is "first pass," then the line 215 is placed at the binary one level. This enables the signal selecting AND circuit 205, the other two AND circuits 204 and 206 being disabled. This enables the add-subtract control signal produced by the EXCLUSIVE OR circuits 200 and 201 and appearing on conductor 202 to be supplied to the add/subtract control line 42. This is the normal situation when handling either zoned or packed decimal numbers, provided the operands are not larger than the width of the operand processing hardware, which width in the present example is four bytes. This is also the case, that is, AND circuit 205 being enabled, for the first pass with larger than hardware width decimal operands.

For larger than hardware width decimal operands, the different parts of the operands are run through the arithmetic unit 10 on different passes. The sign fields are present only during the first pass. Thus, the operation to be executed (add or subtract) must be remembered for use during the subsequent passes. This remembering is done by a binary latch circuit 217 which is operative during the first pass to store the status of the add/subtract signal on conductor 202 during the first pass and to make such signal status available on its output line 218 during subsequent passes. This latch signal on conductor 218 is supplied to the signal selecting AND circuit 206 which is the one which is enabled when making subsequent passes with decimal operands. This makes the stored first pass add/subtract signal available on the output line 42 during subsequent passes.

The signal switching circuitry 203 performs one further function. It enables the output line 42 to be forced to the subtraction-indicating binary one level whenever the arithmetic unit 10 is to perform a recomplement operation. This is accomplished by supplying the recomplement control signal on control line 30 directly to the OR circuit 207. Thus, when performing a recomplement operation (control line 30 at binary one level), the executed arithmetic operation is always subtraction.

The sign handling circuitry 40 further includes sign control circuitry responsive to the sign field in one of the input decimal operands for causing the bits in the sign field position in the final output number produced by the output corrector 50 to have the proper sign code values. This sign control circuitry includes a logical signal switching or signal selecting mechanism 220 for choosing between the output of the A operand sign code detector 180 and the output of the B operand sign code detector 183. The signal switching or signal selecting circuitry 220 includes AND circuits 221 and 222 which have their outputs connected to different inputs of an OR circuit 223. The output of OR circuit 223 is connected to the control line 46 which supplies the output sign control signal to the output corrector 50.

The switching between the A and B operand signs is accomplished by the recomplement signal on control line 30, this signal being supplied directly to the AND circuit 222 and to the AND circuit 221 by way of a NOT circuit 224. During a recomplement operation, the recomplement signal on line 30 is at the binary one level. This enables the lower AND circuit 222 and disables the upper AND circuit 221. When no recomplement is being performed, the recomplement signal is at the zero level and the situation is reversed. This zero level enables the upper AND circuit 221 and disables the lower AND circuit 222.

The upper AND circuit 221 receives the output signal from the A operand sign code detector 180, which output signal indicates the polarity sign of the A side input operand in A register 21. The lower AND circuit 222 receives by way of a NOT circuit 225 a logically inverted replica of the output signal from the B operand sign code detector 183, which output signal indicates the polarity sign for the B side input operand in B register 31. Thus, during normal operation (no recomplement), the sign control signal on output line 46 indicates the polarity sign of the A side input operand in A register 21. As will be seen, this causes the sign field of the resultant number produced by output corrector 50 to be given the same polarity value as the polarity value of the A side input operand in A register 21. Conversely, when a recomplement operation is being performed, the signal level on output line 46 is set to indicate a polarity value opposite to the polarity value indicated by the sign field of the number being recomplemented, such number being located in the B register 31 during the recomplement operation. As will be seen, this reverses the polarity value of the recomplemented number.

OUTPUT CORRECTOR — FIGS. 10–13

Figure 10:
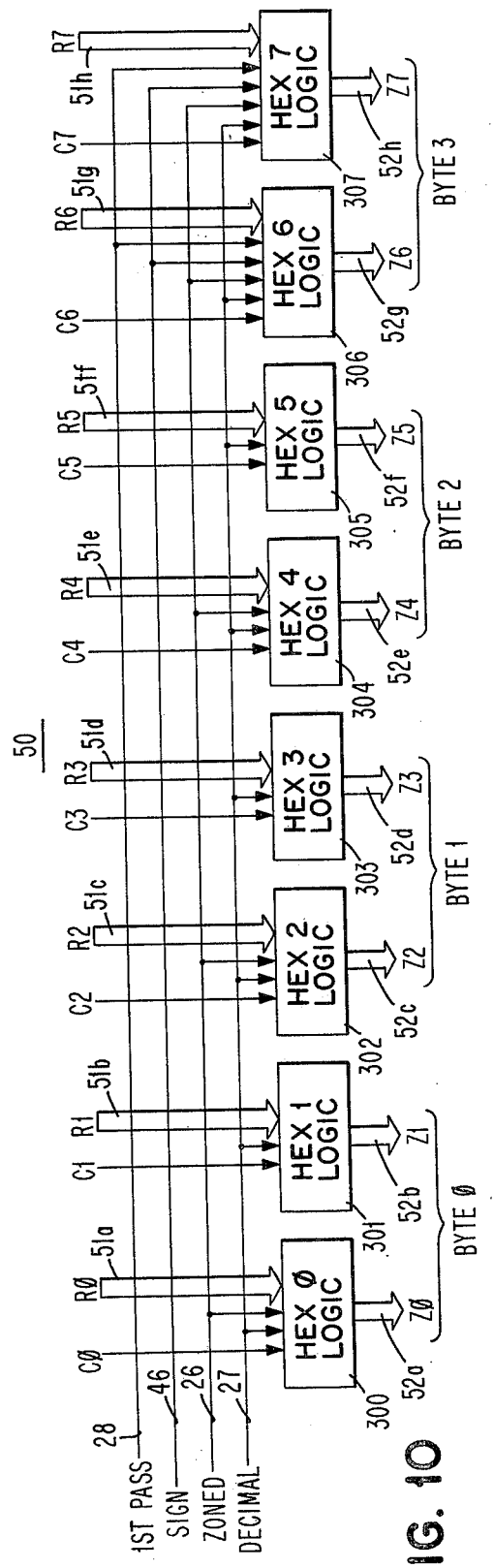
FIG. 10 is a logic circuit diagram showing a representative form of construction for the output corrector of FIG. 1.

FIG. 10 shows a representative form of internal construction for the output corrector 50 of FIG. 1. This FIG. 10 embodiment for the output corrector 50 includes a set of eight four-stage logic units 300–307 for individually handling different ones of the eight hex fields in the 32-bit binary bit sequence appearing at the output of the binary adder 20. The eight 4-bit hex fields received from the binary adder 20 are designated as $R\phi$-R7, while the eight 4-bit hex fields sent to the output or Z register 53 are identified as $Z\phi$-Z7. The eight four-conductor data buses 51a–51h make up the 32-conductor data bus 51 of FIG. 1. Similarly, the eight four-conductor data buses 51a–52h make up the 32-conductor data bus 52 of FIG. 1. The input lines labeled $C\phi$-C7 are the hex field carry-out status lines from the binary adder 20, $C\phi$ being the carry-out status line for hex field $\phi$, C1 being the carry-out status line for hex field 1, and so forth.

Figure 11:
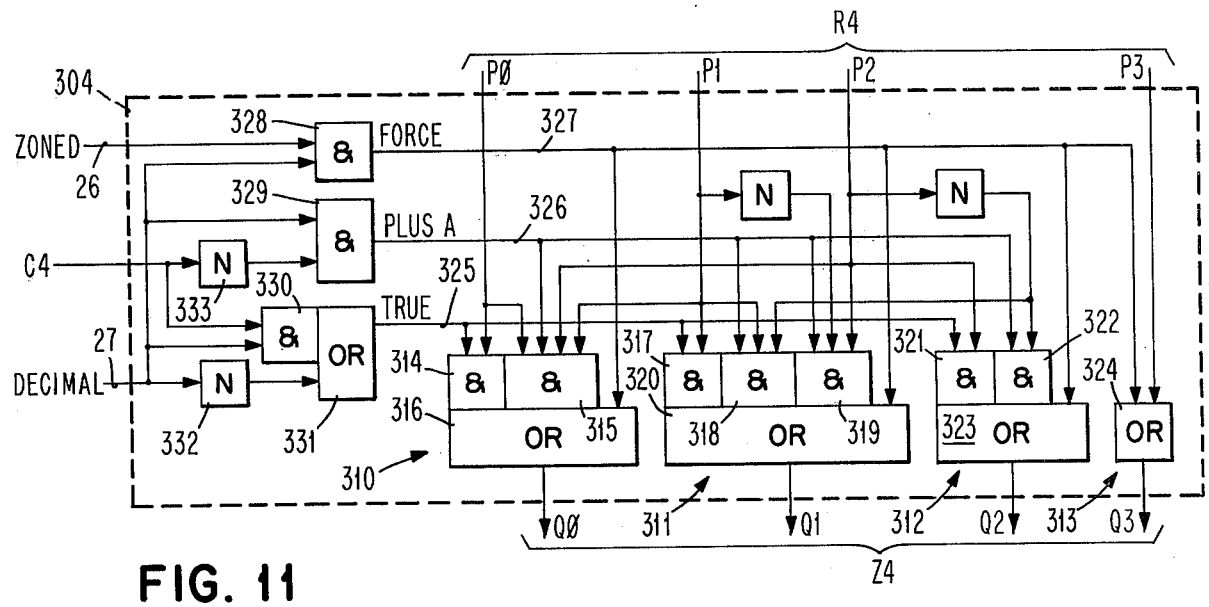
FIG. 11 is a logic circuit diagram showing a representative form of internal construction for the "hex 4" logic unit of FIG. 10.
Figure 12:
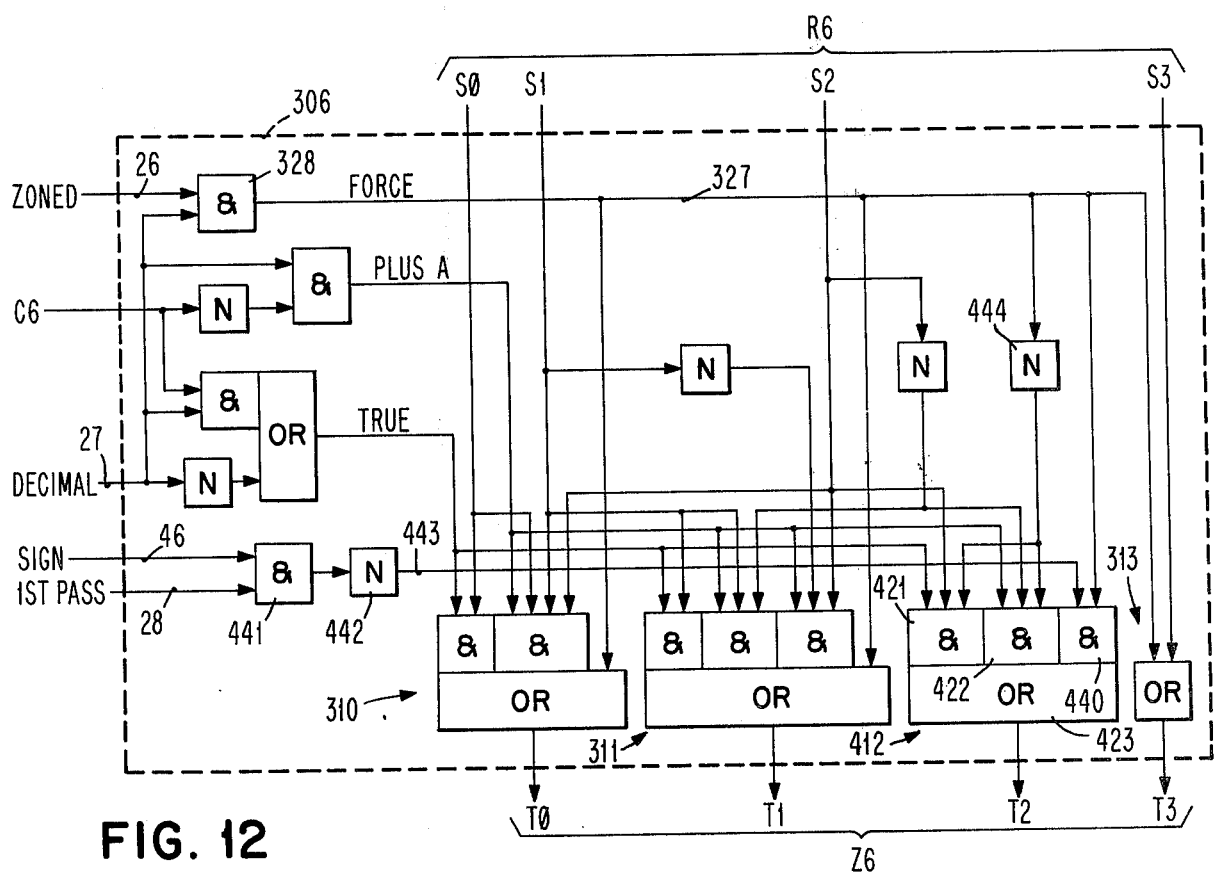
FIG. 12 is a logic circuit diagram showing a representative form of internal construction for the "hex 6" logic unit of FIG. 10.
Figure 13:
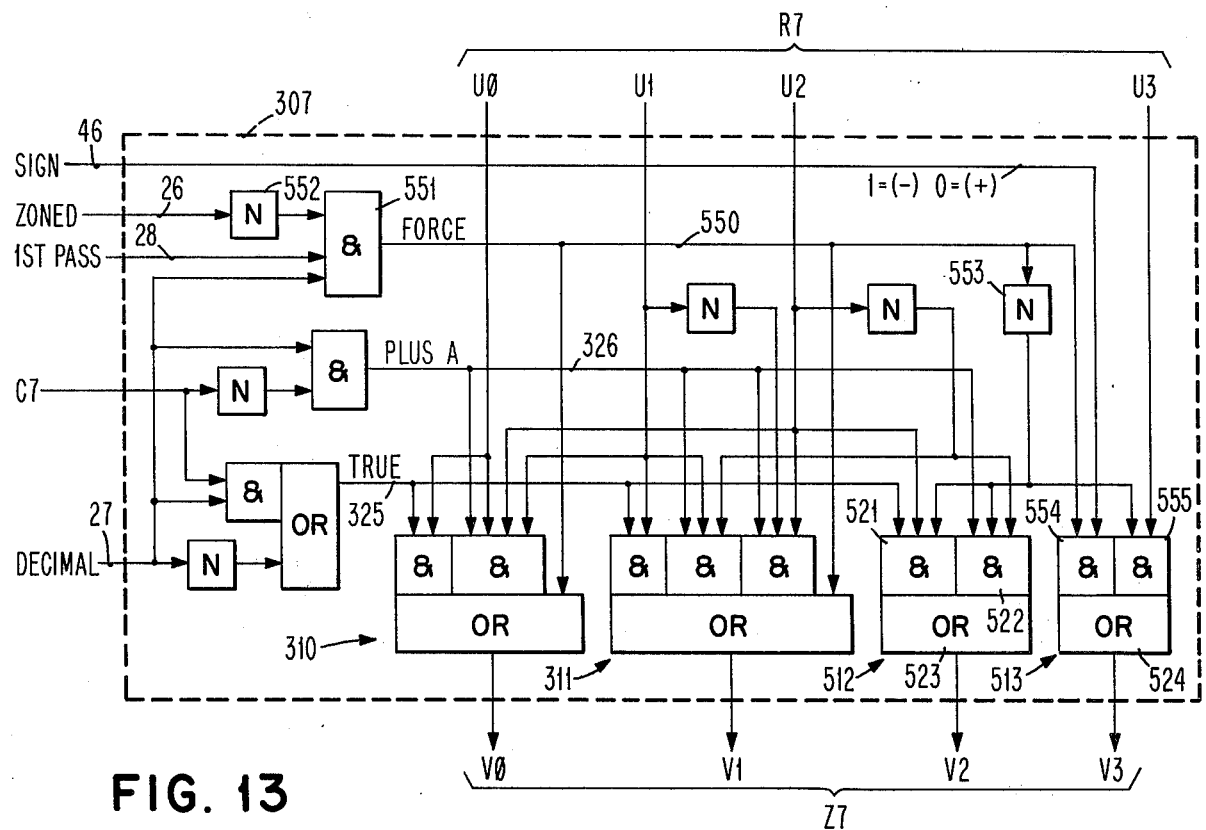
FIG. 13 is a logic circuit diagram showing a representative form of internal construction for the "hex 7" logic unit of FIG. 10.

A representative form of internal construction for the hex four logic unit 304 is shown in FIG. 11. A representative form of internal construction for the hex six logic unit 306 is shown in FIG. 12. A representative form of internal construction for the hex seven logic unit 307 is shown in FIG. 13. As indicated in FIG. 10, the first pass and sign control signals on control lines 28 and 46 are supplied only to the two lower order logic units 306 and 307.

Considering first the hex four output corrector logic unit 304 and referring to FIG. 11, it is seen that such hex hour logic unit 304 includes four separate stages 310–313 which individually produce on their output lines different ones of the bit signals $Q\phi$-Q3 which make up the Z4 hex field supplied to the Z register 53. The first or higher order bit position stage 310 includes AND circuits 314 and 315 having their outputs connected to different inputs of an OR circuit 316. The second bit position stage 311 includes AND circuits 317, 318 and 319 having their outputs connected to different inputs of an OR circuit 320. The third bit position stage 312 includes AND circuits 321 and 322 having their outputs connected to different inputs of an OR circuit 323. The fourth or lower order bit position stage 313 is formed by an OR circuit 324.

The various AND circuits in the stages 310–313 are controlled by different one of a set of three control lines 325–327. As indicated by the names applied to these control lines 325–327, the logic unit 304 is capable of selectively providing any one of the following three functions:

a. true (or unmodified) data transfer
b. plus A (digit value + ten) data transfer
c. force four ones When the "true" control line 325 is set to the binary one level, the AND circuits 314, 317 and 321 are placed in an enabled condition and the remainder of the AND circuits are in a disabled condition. Assuming the "force" line 327 is at the binary zero level, this enables the adder 20 output bits $P\phi$-P3 to be passed on without modification to the $Q\phi$-Q3 output bit lines which run to the Z register 53.

When the "plus A" control line 326 is set to the binary one level, the AND circuits 315, 318, 319 and 322 are placed in an enabled condition and the remainder of the AND circuits are in a disabled condition. These enabled AND circuits 315, 318, 319 and 322 operate to increase the value of the digit represented by the coding of the R4 hex field by a factor of ten (hexadecimal A), provided that such digit value is in the 6-F hexadecimal range. Because of the plus six action in the complement and B input modifier 33, this is the number range of interest for the output corrector 50.

The necessary logic for increasing the binary coded decimal digit value by ten is as follows:

$$Q\phi = P\phi.P1.P2 \qquad (5)$$

$$Q1 = P1.\overline{P2} + \overline{P1}.P2 \qquad (6)$$

$$Q2 = \overline{P2} \qquad (7)$$

$$Q3 = P3 \qquad (8)$$

The plus (+) sign denotes the logical OR function and the dot (.) symbol denotes the logical AND function.

AND circuit 315 and OR circuit 316 of the first stage 310 perform the logic indicated by equation (5). AND circuits 318 and 319 and OR circuit 320 in the second stage 311 perform the logic indicated by equation (6). AND circuit 322 and OR circuit 323 in the third stage 312 perform the logic indicated by equation (7). In this case, the output Q2 is simply the one's complement of the input P2. The OR circuit 324 in the fourth stage 313 performs the logic indicated by equation (8). In this case, the output bit Q3 is the same as the input bit P3.

As previously indicated, the adding of ten to the digit value is equivalent to subtracting six from the digit value. This is because a 4-bit system is a hexadecimal system and ten is the sixteen's complement of six.

When the "force ones" control line 327 is set to the binary one level, each of the four Q$\phi$-Q3 output bit lines is forced to the binary one level. This is because the binary one level on the control line 327 is supplied directly to the four OR circuits 316, 320, 323 and 324. And this forcing of four ones occurs regardless of the status of the other two control lines 325 and 326. The binary one level on control line 327 overrides any zero values that might be supplied to other inputs of the OR circuits 316, 320, 323 and 324.

The signal levels on control lines 325–327 are determined by different combinations of the zoned and decimal status signals on control lines 26 and 27 and the C4 carry-out signal on the C4 status line for hex field four in the adder 20. The circuitry for performing the desired control logic is comprised of AND circuits 328–330, OR circuit 331 and NOT circuits 332 and 333.

If binary numbers are being handled by the arithmetic unit 10, then the decimal status signal on control line 27 is at the binary zero level. This disables the AND circuits 328–330. It also places the output of NOT circuit 332 at the binary one level, which binary one level is transferred by the OR circuit 331 to the "true" control line 325. This enables the data on input bit lines P$\phi$-P3 to be transferred without modification to the Q$\phi$-Q3 output bit lines. As will be seen, the same thing happens in each of the other hex logic units 300–303 and 305–307 when processing binary numbers. Thus, the output corrector 50 transfers or passes all 32 data bits without modification when the arithmetic unit 10 is handling binary operands.

When the arithmetic unit 10 is handling zoned decimal numbers, both the zoned status signal on control line 26 and the decimal status signal on the control line 27 are at the binary one level. Such occurrence causes the AND circuit 328 to produce the one forcing binary one level output on the "force" control line 327. This forces each of the Q$\phi$-Q3 output bit lines to the binary one level. This is the desired result when handling zoned decimal data because the hex four field in such case is a zone field. Thus, the desired zone code value is established for the zone field.

When the arithmetic unit 10 is handling packed decimal numbers, the "force" control line 327 remains at the binary zero level and either the "true" control line 325 or the "plus A" control line 326 will be placed at the binary one level, depending on the status of the C4 carryout signal. If a carry-out is produced by the hex four field (C4 = 1), then the hex four or R4 digit value in correct and no modification is required. In this case, both inputs to the AND circuit 330 are at the binary one level to place the "true" control line 325 at the binary one level. This passes the P$\phi$-P3 bits without modification to the Q$\phi$-Q3 output lines. If, on the other hand, no carry-out is produced by the hex four field (C4 = 0) then the hex four digit value is in error by a factor of six. In this case, both inputs to the AND circuit 329 are at the binary one level, which in turn sets the "plus A" control line 326 to the binary one level. This corrects the hex four digit value by adding ten thereto, which, as previously indicated, is the same as subtracting six.

Returning to FIG. 10, each of the higher order even-numbered hex logic units 300 and 302 are of exactly the same internal construction as shown in FIG. 11 for the hex logic unit 304, except that the appropriate ones of adder 20 carry-outs C$\phi$ and C2 are used in place of the C4 carry-out. The odd-numbered hex logic units 301, 303 and 305 are also of this same internal construction, except that the "force ones" function is deleted and the appropriate adder 20 carry-outs are used. In other words, for these odd-numbered logic units 301, 303 and 305, the zoned status control line 26, the AND cirucit 328 and the "force ones" control line 327 are omitted. This is because the hex 1, hex 3 and hex 5 fields are always digit fields when handling decimal numbers. Thus, for these units 301, 303 and 305, the choosing between the true and plus A functions also occurs for zoned decimal numbers, the same as it does for packed decimal numbers. In both such cases, that is, zoned and packed, the choice is determined by the status of the carry-out signal for the particular hex field being considered.

The situation for the two lower order hex logic units 306 and 307 is somewhat more complicated because of the need to take into account the presence or absence of a sign field and, when present, the polarity of such sign field. In this regard, it should be noted that only selected ones of the six possible decimal sign codes set forth in Table II are valid for the output numbers produced by the arithmetic unit 10. These valid codes are referred to as preferred output sign codes. For both packed and zoned decimal data, the preferred negative sign code is 1101 (hexadecimal code D). For zoned decimal, the preferred positive sign code is 1111 (hexadecimal code F). For packed decimal, the preferred positive sign code is 1100 (hexadecimal code C). The hex six and hex seven logic units 306 and 307 are implemented so as to output only these preferred sign codes.

Consider now what is required of the hex six logic unit 306. For binary and packed decimal numbers, it is required to operate in the same manner as that previously described for the hex four logic unit 304. For the case of zoned decimal numbers, on the other hand, there are two possibilities. The hex six field may be either a decimal sign field or a zone field. It is a sign field when making a first pass operation for a given pair of operands and it is a zone field when making a subsequent pass operation for the same pair of operands.

Consider now the different possible zone and decimal sign field codes for the hex six logic 306. These are as follows:

1111 = zone code
    1111 = positive sign code
    1101 = negative sign code

The positive sign code is the same as the zone code. The negative sign code is also the same except for the third bit position. Thus, the hex six logic unit 306 can be of the same construction as the hex four logic unit 304, except that a mechanism must be included to force the third bit position to zero when handling zoned decimal numbers on a first pass operation and where the sign is negative or minus.

Referring now to FIG. 12, there is shown a representative form of internal construction for the hex six logic unit 306. It is substantially the same as the construction shown in FIG. 11 for the hex four logic unit 304, except for the third stage 412 which handles the third bit position. For sake of comparison, the same reference numerals will be used for the elements which are the same as those described in connection with FIG. 11. As indicated in FIG. 12, the modified third stage 412 includes AND circuits 421 and 422 and OR circuit 423. These correspond in purpose to the AND circuits 321, 322 and the OR circuit 323 of FIG. 11. As a point of departure, the modified third stage 412 also includes a fourth AND circuit 440 which provides the zero forcing function for the occurrence of a first pass zoned decimal negative sign. This added AND circuit 440 is controlled by the sign control signal on control line 46 and the first pass status signal on control line 28, these signals being supplied to an AND circuit 441 having its output coupled to a NOT circuit 442. The NOT circuit 442 is connected by way of a conductor 443 to a first input of the zero controlling AND circuit 440. The second input to this AND circuit 440 is the "force ones" signal on the control line 327.

The logic performed by the AND circuit 441 and the NOT circuit 442 is such as to set the conductor 443 to the binary zero level only if the status is first pass and the sign is minus. The occurrence of the zero level on conductor 443 disables the AND circuit 440 which, in turn, forces the T2 output bit line to zero. For any other first pass/sign combination, the conductor 443 is at the binary one level. This places the AND circuit 440 in an enabled condition so as to enable the "force ones" signal on the control line 327 to force the T2 bit output line to a binary one level. A further NOT circuit 444 is included to disable the AND circuits 421 and 422 when handling zoned decimal numbers. This is needed to prevent the appearance on the T2 bit output line of an erroneous one level when the AND circuit 440 is attempting to force a zero level.

Except for the foregoing differences, the operation of the FIG. 12 logic unit 306 is the same as the operation of the FIG. 11 logic unit 304.

Referring now to FIG. 13, there is shown a representative form of internal construction for the hex seven logic unit 307. For case of comparison with FIG. 11, elements which are the same as those in FIG. 11 are given the same reference numerals as in FIG. 11. The operations required of the hex seven logic unit 307 are the same as those required of the other odd-numbered hex logic units 301, 303 and 305 with one important exception. When the number format is packed decimal and the status is first pass, then and only then the hex seven unit 307 is required to force the output data bits $V\phi$-V3 to assume the proper packed decimal sign code. For any other case, namely, binary numbers, zoned decimal numbers or packed decimal number portions on a subsequent pass, the hex seven unit 307 operates in the same manner as the other odd-numbered hex units 301, 303 and 305.

The required packed decimal output sign codes are:
1100 = positive sign code
1101 = negative sign code The only difference in the two codes is in the fourth or lowest order bit position. Thus, to obtain the packed decimal sign code, it is sufficient to force the outputs of the two higher order bit positions ($V\phi$ and V1) to assume a binary one value, to force the output of the third bit position (V2) to assume a binary zero value and to set the output of the fourth bit position (V3) in accordance with the value of the sign control signal on control line 46. This is what is done in the FIG. 13 embodiment.

As indicated in FIG. 13, the logic stages 310 and 311 for the two higher order bit positions are the same as in FIG. 11. The logic stages 512 and 513 for the two lower order bit positions, on the other hand, are somewhat modified. Also, the logic which drives the "force" control line, here numbered 550, is somewhat different. The logic for driving the other two control lines 325 and 326 remains the same.

Consider now what happens when it is desired to force a packed decimal sign code. In such case, the decimal and first pass signals supplied to an AND circuit 551 are at the binary one level. Since the format is a packed format, the zoned signal on control line 26 is at the binary zero level. This is inverted by NOT circuit 552 to provide a binary one level at the third input of the AND circuit 551. With these input conditions, the AND circuit 551 drives the "force" control line 550 to the binary one level. This forces the $V\phi$ and V1 output bit lines to the binary one level. The one level on "force" control line 550 is inverted by a NOT circuit 553 to supply a zero level input to each of the AND circuits 521 and 522 in the third stage 512. This disables both of these AND circuits 521 and 522, thus forcing the V2 output bit line to the binary zero level.

With respect to the fourth stage 513, the one level on control line 550 places a first AND circuit 554 in an enabled condition and the accompanying zero level at the output of NOT circuit 553 disables a second AND circuit 555. The first of these AND circuits 554 also receives the sign control signal on the control line 46. Thus, the V3 output bit line is caused to assume the same binary level as the sign control signal on control line 46. If such sign control signal is at the negative-indicating one level, then the V3 output line will also be driven to the one level which, as seen above, is the desired level for the negative sign code. Conversely, if the sign control signal is at the zero level, then the V3 output line also goes to the zero level.

In the foregoing manner, the hex seven logic unit 307 forces the desired packed decimal sign code of either "1100" or "1101" during a first pass for a packed decimal number.

Assume now that one of the other conditions exists, namely, that binary numbers are being processed or zone decimal numbers are being processed or it is a packed decimal subsequent pass operation. For these other cases, at least one of the inputs to the AND circuit 551 will be at the zero level. This causes the "force" control line 550 to go to the zero level. This removes the forcing action from the first two stages 310 and 311 to allow such stages to operate in their previously considered manner. Such zero level on the control line 550 is also inverted by the NOT circuit 553 to supply one level inputs to the AND circuits 521 and 522 in the third stage 512. This allows the third stage 512 to operate in the same manner as the third stages in the other odd-numbered hex logic units. In particular, the AND circuit 521 will be activated by the "true"

control line 325 to pass a true replica of the U2 bit value and the AND circuit 522 will be activated by the "plus A" control line 326 to pass a complement replica of the U2 bit value. With respect to the fourth stage 513, the zero level on control line 550 will disable the AND circuit 554 and the accompanying one level at the output of NOT circuit 553 will enable the second AND circuit 555. This enables the fourth stage 513 to pass the U3 bit value in an unmodified manner.

COMPLEMENT DETECTOR — FIG. 14

Figure 14:
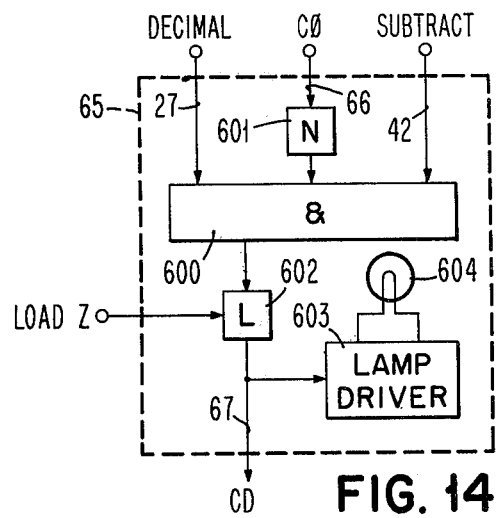
FIG. 14 is a logic circuit diagram showing a representative form of construction for the complement detector of FIG. 1.

Referring now to FIG. 14, there is shown a representative form of internal construction for the complement detector 65 of FIG. 1. As previously indicated, the complement detector 65 is used to provide an indication when the output number from the output corrector 50 is in complement form, as opposed to true magnitude form. The complement form indication can be used as a basis for initiating a recomplement operation to convert the complement form output into a true form output. As previously indicated, the hardware indication that the output is in complement form is the occurrence of a no carry condition ($C\phi = 0$) on the $C\phi$ carry-out status line when performing a decimal subtraction operation.

The complement detector embodiment of FIG. 14 includes an AND circuit 600 for receiving the decimal status signal on control line 27 and the add/subtract control signal on control line 42. The carry-out signal on the $C\phi$ carry-out status line 66 is supplied to the AND circuit 600 by way of a NOT circuit 601. Thus, when a decimal subtraction operation is performed and there is no $C\phi$ carry-out ($C\phi = 0$), the AND circuit 600 produces a binary one level output. The output of the AND circuit 600 is loaded into a binary latch circuit 602 at the same time that the output number is loaded into the Z register 53. If the output of AND circuit 600 was at the binary one level, then such one value is loaded into the latch circiut 602 to produce a complement form indicating binary one level indication on the complement detector output status line 67.

Where automatic recomplementing is desired, the CD status signal on status line 67 is supplied to the control section of the data processor, such control section reacting to same to initiate the recomplement operation when appropriate. A complement form indicating one level signal at the output of latch circuit 602 will also cause a lamp driver circuit 603 to light an indicator lamp 604 to provide a visual status indication. Where the arithmetic unit 10 is used in a high speed data processor and automatic recomplementing is used, the lamp driver 603 and lamp 604 would be omitted because the speed of operation would make visual indications impractical.

OPERATION OF THE FIG. 1 ARITHMETIC UNIT

An important feature of the arithmetic unit 10 of FIG. 1 is its ability to perform arithmetic operations with multidigit zoned decimal operands without having to first convert such operands to a packed format. Furthermore, such arithmetic operations are performed by means of a parallel binary adder 20 of a type suitable for handling pure binary numbers and having no special provisions for accommodating zoned decimal numbers. This is desirable because it enables one and the same binary adder to be used for binary operands, zoned decimal operands and packed decimal operands. In other words, the zoned decimal capability is added without sacrifice to the more customary types of data processor operations.

The ability to handle zoned decimal operands with an ordinary binary adder 20 is accomplished by the use of the A and B input modifiers 23 and 33 and the output corrector 50. The A and B input modifiers 23 and 33 are operative when handling zoned decimal operands to precondition the zone and sign fields in such operands so that they will not mess up the arithmetic action inside of the binary adder 20. After completion of the arithmetic operation in the adder 20, the output corrector 50 is used to restore the zone and sign fields in the resultant number to their proper condition. When handling something other than decimal numbers, the decimal and sign field preconditioning and postconditioning functions in the input modifiers 23 and 33 and the output corrector 50 are disabled. This enables the processing of such other items in their customary manner.

A typical operation of the arithmetic unit 10, when operating on zoned decimal numbers, will be explained by using some typical examples. In particular, the following example will be used to explain the addition of two zoned decimal numbers:

| A side input number | F6F8 |
|---|---|
| B side input number | + F1F9 |
| Expected Result | F8F7 |

Hexadecimal notation (see Table III above) is used here and will be used throughout the following discussion because that is the best way of explaining what happens to binary coded decimal digits. Also, it enables the 1111 zone code for numerical characters to be represented by the single hexadecimal digit F. Thus, the F's in the above example represent the zone fields in the two input operands and in the expected result. Actually, the rightmost F in each number is a sign field with the sign code being the positive-indicating 1111 sign code (see Table II above). Thus, all numbers in the above example are positive numbers.

The following example will be used as an example of a zoned decimal subtraction operation;

| A side input number | F6F8 |
|---|---|
| B side input number | − F1F9 |
| Expected Result | F4F9 |

The two input operands in this example are the same as in the addition example.

The purpose of the input modification or characterization provided by the A and B input modifiers 23 and 33 is to alter the incoming zoned decimal data so that when the two input operands are added together inside the binary adder 20, the carries will be propagated correctly at the appropriate zone and digit boundaries. There are two aspects to this input characterization. One relates to the zone (and sign) fields in the input operands and the other relates to the digit fields in the input operands.

Considering first the digit fields, it is noted that in decimal arithmetic the number base is ten so that two digits being added together will produce a carry into the next higher digit for all results greater than nine. Binary coded decimal digits are, however, 4-bit binary coded digits. Such a 4-bit system constitutes a hexadecimal (base sixteen) system. In other words, a 4-bit binary coded digit is, in reality, a hexadecimal digit. Thus, when two such digits are added together, they will produce a carry into the next higher digit for all results greater than fifteen (hexadecimal "F"). Therefore, since the difference in these number bases is six (16 − 10 = 6), each binary coded decimal digit field coming through the B input modifier 33 is increased by a factor of six, so that when the binary addition takes place inside the adder 20, the carry-outs from the digit fields will be correct.

Table V shows all valid input decimal digits and the associated hexadecimal representations after going through the "plus six" characterization function which is provided by the B input modifier 33 when performing an addition operation.

TABLE V

B SIDE DIGIT FIELD ADDITION CHARACTERIZATION

| INPUT | | AFTER INCREASE | |
|---|---|---|---|
| Decimal Digit | Binary Representation | Hexadecimal Digit | Binary Representation |
| 0 | 0000 | 6 | 0110 |
| 1 | 0001 | 7 | 0111 |
| 2 | 0010 | 8 | 1000 |
| 3 | 0011 | 9 | 1001 |
| 4 | 0100 | A | 1010 |
| 5 | 0101 | B | 1011 |
| 6 | 0110 | C | 1100 |
| 7 | 0111 | D | 1101 |
| 8 | 1000 | E | 1110 |
| 9 | 1001 | F | 1111 |

The digit fields in the A side input operand are not modified as they flow through the A input modifier 23.

If digit carries are generated during the addition inside adder 20, they should increase the value of the next higher order result digit by a factor of one. However, the next higher field in zoned decimal format is a zone field. Therefore, any carry coming into a zone field from a lower order decimal digit result field must be propagated through the zone field so that it is faithfully inputted to the next higher order decimal digit field. This is accomplished by forcing all A side input zone field bits to a binary zero value and forcing all B side input zone bits to a binary one value. When performing the addition inside the adder 20, the carries coming into the zone fields will thus be propagated through such zone fields as shown below:

| | |
|---|---|
| A side characterized zone | 0000 |
| B side characterized zone | 1111 |
| Carry in = 1 | 1 |
| Carry out = 1 | 0000 |
| A side characterized zone | 0000 |
| B side characterized zone | 1111 |
| Carry in = 0 | 0 |
| Carry out = 0 | 1111 |

It is noted that for the EBCDIC code the zone fields in the incoming B side input operand already have the zone code of 1111. Thus, if desired, the zone fields in the B side input operand could be allowed to flow through the B input modifier 33 in an unmodified manner. It would, of course, still be necessary to insure that the sign field bits are set to 1111 by the B input modifier 33. In the above-described hardware embodiment, the procedure used is to force all zone field and sign field bits to the binary one level as the B input operand flows through the modifier 33, though, as just mentioned, this is not really necessary for the zone field bits.

The two input operands for the zoned decimal addition example given above are characterized by the A and B input modifiers 23 and 33 in the manner shown in Table VI.

TABLE VI

TYPICAL ADDITION INPUT CHARACTERIZATION

| Input Location | Hexadecimal Input Data | Data After Characterization | |
|---|---|---|---|
| | | Hexadecimal | Binary |
| A side | F6F8 | 0608 | 0000 0110 0000 1000 |
| B side | F1F9 | F7FF | 1111 0111 1111 1111 |

Note that the digit value for each of the digit fields in the B side input is increased by a factor of six. The resulting characterized binary bit sequences shown on the right in Table VI are the two quantities which are supplied to the left and right side inputs of the adder 20. For sake of completeness, it should also be noted that since the hardware embodiment described herein has a data flow width of four bytes, the above two byte bit sequences represent only the lower order halves of the inputs to the adder 20. The higher order two bytes for the left side input to the adder 20, using hexadecimal notation, would be 0000. For the right side input, they would be F6F6. Note the effect of the "plus six" action on the two leading zero digit fields. For sake of simplicity, the higher order two bytes will, for the most part, not be mentioned throughout the remainder of this discussion.

For a zoned decimal subtraction operation, the A side input characterization for both the zone and digit fields is the same as just described for the addition operation. Also the input characterization of the zone and sign fields for the B side operand is the same. The input characterization of the digit fields in the B side operand, however, is somewhat different. Since the binary adder 20 is truly just an adder, a subtraction operation is performed by complementing the B side numerical data contained in the B side digit fields before such data is supplied to the adder 20. The "plus six" increase of the digit values in the digit fields is accomplished by complementing the digit fields in base sixteen instead of base ten. This is done by simply inverting the binary bits (one's complement) in the digit fields and forcing a carry-in of one into the lowest order stage of the binary adder 20, this being accomplished by way of the $C_{in}$ carry-in line 73. This, in effect, produces a binary two's complement or hexadecimal sixteen's complement on a 4-bit digit basis. It is equivalent to taking the 10's complement and adding six. Thus, the "plus six" action is inherent in the complementing action.

Table VII shows all valid input decimal digits and the associated hexadecimal and binary representations after going through the B side digit field characterization logic provided by the complement and B input modifier 33 for a zoned decimal subtraction operation.

TABLE VII

B SIDE DIGIT FIELD SUBTRACTION CHARACTERIZATION

| INPUT | | AFTER COMPLEMENTATION | |
|---|---|---|---|
| Decimal Digit | Binary Representation | Hexadecimal Digit | Binary Representation |
| 0 | 0000 | F | 1111 |
| 1 | 0001 | E | 1110 |

TABLE VII-continued

| B SIDE DIGIT FIELD SUBTRACTION CHARACTERIZATION | | | |
|---|---|---|---|
| INPUT | | AFTER COMPLEMENTATION | |
| Decimal Digit | Binary Representation | Hexadecimal Digit | Binary Representation |
| 2 | 0010 | D | 1101 |
| 3 | 0011 | C | 1100 |
| 4 | 0100 | B | 1011 |
| 5 | 0101 | A | 1010 |
| 6 | 0110 | 9 | 1001 |
| 7 | 0111 | 8 | 1000 |
| 8 | 1000 | 7 | 0111 |
| 9 | 1001 | 6 | 0110 |

For the zoned decimal subtraction operation, the input operands for the subtraction example given above are characterized by the A and B input modifiers 23 and 33 in the manner shown in Table VIII.

TABLE VIII

| TYPICAL SUBTRACTION INPUT CHARACTERIZATION | | | |
|---|---|---|---|
| Input Location | Hexadecimal Input Data | Data After Characterization | |
| | | Hexadecimal | Binary |
| A side | F6F8 | 0608 | 0000 0110 0000 1000 |
| B side | F1F9 | FEF6 | 1111 1110 1111 0110 |

Note the difference in this subtraction characterization as compared to the addition characterization shown in Table VI, the difference occurring in the digit fields for the B side operand. The characterized binary bit sequences shown on the right in Table VIII are the quantities which are supplied to the two input sides of the adder 20 for the subtraction operation.

The binary addition which occurs inside the adder 20 for the characterized A and B operands for the addition example is shown in Table IX.

TABLE IX

| TYPICAL ADDITION | | |
|---|---|---|
| ADDER LOCATION | HEXADECIMAL | BINARY |
| A side input | 0608 | 0000 0110 0000 1000 |
| B side input | F7FF | 1111 0111 1111 1111 |
| Adder Output | FE07 | 1111 1110 0000 0111 $C_{in}=0$ |

Carries→ C4=0 C5=0 C6=1 C7=1

The binary addition taking place inside the adder 20 for the subtraction example is shown in Table X.

TABLE X

| TYPICAL SUBTRACTION | | |
|---|---|---|
| ADDER LOCATION | HEXADECIMAL | BINARY |
| A side input | 0608 | 0000 0110 0000 1000 |
| B side input | FEF6 | 1111 1110 1111 0110 |
| Adder Output | 04FF | 0000 0100 1111 1111 $C_{in}=1$ |

Carries→ C4=1 C5=1 C6=0 C7=0

In both cases, that is, for both addition and subtraction, a note must be made of the hex field carry-outs C4, C5, C6 and C7 occurring within the adder 20 since these hex field carries determine the type of output correction to be applied. For Tables IX and X, it is assumed that the two-byte operands in the examples being considered are right justified and are hence handled by the stages for the two lower order bytes inside the fourbyte adder 20. As will be seen, it is also necessary to take into account the hex field carry-outs $C\phi$, C1, C2 and C3 even though the higher order two bytes are not needed by the two-byte operands being considered in the present examples.

The hex field carry-outs determine the corrective action needed in the output corrector 50 to convert the data appearing at the output of the adder 20 back to a valid zoned decimal format. The correction for the digit fields will be considered first. With respect to the digit fields, since the values of the B side input digit fields were increased by a factor of six to produce the appropriate digit field carries for base sixteen, no adder output digit field correction is required for any digit field for which a digit field carry occurred (C = 1) during the addition inside the adder 20. However, if no digit carry was produced (C = 0) at the digit boundary, then the value in the corresponding output digit field must be reduced by a factor of six to compensate for the original increase of six to the B side input digit fields. For the present examples, this applies to the two "unused" or higher order digit fields in hex positions one and three as well as to the "used" lower order digit fields in hex positions five and seven.

Table XI shows the digit field output correction for all possible adder 20 output digit fields which can be produced with no corresponding digit field carry-out.

TABLE XI

| DIGIT FIELD OUTPUT CORRECTION (Digit Carry Out = 0) | | | |
|---|---|---|---|
| Adder Output | | Corrected Output | |
| Hexadecimal Digit | Binary Representation | Decimal Digit | Binary Representation |
| 6 | 0110 | 0 | 0000 |
| 7 | 0111 | 1 | 0001 |
| 8 | 1000 | 2 | 0010 |
| 9 | 1001 | 3 | 0011 |
| A | 1010 | 4 | 0100 |
| B | 1011 | 5 | 0101 |
| C | 1100 | 6 | 0110 |
| D | 1101 | 7 | 0111 |
| E | 1110 | 8 | 1000 |

TABLE XI-continued

| DIGIT FIELD OUTPUT CORRECTION (Digit Carry Out = 0) | | | |
|---|---|---|---|
| Adder Output | | Corrected Output | |
| Hexadecimal Digit | Binary Representation | Decimal Digit | Binary Representation |
| F | 1111 | 9 | 1001 |

The need for an output correction for the zone fields is similarly dependent on the carries but for opposite values of the hex field carry-outs. In particular, if no zone field carry-out is produced, the adder output zone field will be all 1's and no output correction is required. If, on the other hand, a zone field carry-out is produced, the adder output zone field will be all 0's which requires the forcing of all 1's to produce the valid zone field code.

Table XII summarizes the corrective actions to be taken for both zone and digit fields based on the values of the carry-outs for each four-bit hex field group.

TABLE XII

| | OUTPUT CORRECTION ACTION | |
|---|---|---|
| | | Action Required |
| 4 Bit Group Carry Out | Zone Field | Digit Field |
| 0 | None | Reduce output by 6 |
| 1 | Force 4 ones | None |

As discussed in the foregoing hardware description, the present embodiment corrects the digit field positions, where necessary, by increasing the digit field value by a factor of ten (hexadecimal A) instead of reducing it by a factor of six. This is, of course, entirely equivalent because ten is the sixteen's complement of six. Thus, the correction is applied by adding the complement of six instead of subtracting six. When performing this corrective action of increasing a particular digit value by ten, there is no propagation of the digit carry which is produced. In other words, such digit carries are ignored.

Applying the corrective actions set forth in Table XII to the adder 20 output data for the addition example gives the results shown in Table XIII.

TABLE XIII

| TYPICAL ADDITION OUTPUT CORRECTION | | |
|---|---|---|
| Item | Hexadecimal | Binary |
| Group Carries → | 3 | 0 0 1 1 |
| Adder Output | FE07 | 1111 1110 0000 0111 |
| Corrective Action | +0AF0 | +0000 1010 1111 0000 |
| Net Output Result | F8F7 | 1111 1000 1111 0111 |

Applying the same corrective actions to the adder 20 output data for the subtraction example, gives the results shown in Table XIV.

TABLE XIV

| TYPICAL SUBTRACTION OUTPUT CORRECTION | | |
|---|---|---|
| Item | Hexadecimal | Binary |
| Group Carries → | C | 1 1 0 0 |
| Adder Output | 04FF | 0000 0100 1111 1111 |
| Corrective Action | +F00A | +1111 0000 0000 1010 |
| Net Output Result | F4F9 | 1111 0100 1111 1001 |

Comparing the output results in Tables XIII and XIV with the expected results given hereinabove shows that the corrected output data does in fact represent the correct answers. And these answers are in the proper zoned decimal format.

As set forth in the hardware descriptions given above for the embodiment of the output corrector 50 shown in FIGS. 10–13, such output corrector hardware handles the zone field corrective action in a somewhat different manner than that just described. In particular, in the described hardware embodiment, the zone fields are corrected by simply and arbitrarily forcing each zone field bit to the binary one level. In this case, the zone field carry-outs from the adder 20 are ignored. Either of these two approaches to correcting the zone fields is acceptable and provides the correct result. The approach which uses the zone field carry-outs lends itself better to the method of illustrating the examples being used in this section and hence will be used for the remainder of this discussion.

As with any complement arithmetic computation, it is possible for the arithmetic unit 10 to produce a zoned decimal output in complement form. This will happen in a subtraction operation any time the numerical value of the B side input operand is larger than the numerical value of the A side input operand. Table XV illustrates this result by repeating the above subtraction example, but with the values of the A and B operands reversed.

TABLE XV

| SUBTRACTION EXAMPLE FOR B>A | | | |
|---|---|---|---|
| Item | Hexadecimal | Binary | $C_{in}$ |
| A side input | F1F9 | 1111 0001 1111 1001 | |
| B side input | F6F8 | 1111 0110 1111 1000 | |
| A modified | 0109 | 0000 0001 0000 1001 | |
| B modified | F9F7 | 1111 1001 1111 0111 | ← 1 |
| Group carries | 0011 | 0 0 1 1 | |
| Adder output | FB01 | 1111 1011 0000 0001 | |
| Correction | +0AF0 | +0000 1010 1111 0000 | |
| Final output | F5F1 | 1111 0101 1111 0001 | |
| Expected result | F4D9 | 1111 0100 1101 1001 | |

The expected result is a negative value of 49, the "D" in the third digit position denoting the negative sign. The output produced by the arithmetic unit 10 and supplied to the Z register 53 is, however, the 10's complement of −49 or, in other words, is +51. The hardware indication that the output number supplied to Z register 53 is in complement form in the occurrence of a binary zero value for the $C\phi$ hex field carry-out which is, of course, the carry-out for the adder 20 as a whole. Thus, for a decimal subtraction operation, if there is a $C\phi$ carry-out ($C\phi = 1$), the number supplied to Z register 53 is in true magnitude form and the arithmetic operation is complete. If, on the other hand, there is no $C\phi$ carry-out ($C\phi = 0$), then the number supplied to Z register 53 is in complement form. In such case, the complement form number can be converted to true form by simply subtracting the complemeent form number from an A side input of all zeros and making the sign of the resulting recomplemented number the opposite of the sign of the original output number before recomplementing.

The recomplement operation for the example used in Table XV is shown in Table XVI.

TABLE XVI

RECOMPLEMENT OPERATION

| Item | Hexa-decimal | Binary | | | $C_{in}$ |
|---|---|---|---|---|---|
| A side input | F0F0 | 1111 0000 | 1111 | 0000 | |
| B side input | F5F1 | 1111 0101 | 1111 | 0001 | |
| A modified | 0000 | 0000 0000 | 0000 | 0000 | |
| B modified | FAFE | 1111 1010 | 1111 | 1110 | ← 1 |
| Group carries | 0000 | 0 0 | 0 | 0 | |
| Adder output | FAFF | 1111 1010 | 1111 | 1111 | |
| Correction | +0AEA | +0000 1010 | 1110 | 1010 | |
| Final output | F4D9 | 1111 0100 | 1101 | 1001 | |
| Expected result | F4D9 | | | | |

The $C\phi$ value of zero on the recomplement operation is to be expected. A further recomplement operation should not be performed as a result thereof.

In the foregoing numerical examples, the signs of the A and B operands were positive. This will not, of course, always be the case. Sometimes one or both of the input operands may have a negative sign. In such cases, the arithmetic operation actually executed by the arithmetic unit 10 may not be the same as the arithmetic operation requested by the external selection signal on control line 41. Thus, for example, if an addition operation is requested but one of the input operands is positive and the other negative, the sign handler 40 causes the arithmetic unit 10 to instead perform a subtraction operation. This provides the correct output answer in true magnitude form. Conversely, if a subtraction operation is requested and the input operands are of different signs, the sign handler 40 causes the arithmetic unit 10 to perform an addition operation to obtain the correct true form output.

Typical examples of the sign handling function are shown in Tables XVII–XX. The first two tables, XVII and XVIII, are for zoned decimal numbers and the last two examples of Tables XIX and XX are for packed decimal numbers.

TABLE XVII

ZONED ADDITION

| Item | Sign | Hexadecimal |
|---|---|---|
| Requested operation | + | Add |
| A side operand | + | F6A8 |
| B side operand | − | F1D9 |
| Executed operation | − | Subtract |
| Result | + | F4F9 |

TABLE XVIII

ZONED SUBTRACTION

| Item | Sign | Hexadecimal |
|---|---|---|
| Requested operation | − | Subtract |
| A side operand | − | F6B8 |
| B side operand | + | F1C9 |
| Executed operation | + | Add |
| Result | − | F8D7 |

TABLE XIX

PACKED ADDITION

| Item | Sign | Hexadecimal |
|---|---|---|
| Requested operation | + | Add |
| A side operand | − | 684B |
| B side operand | + | 193E |
| Executed operation | − | Subtract |
| Result | − | 491D |

TABLE XX

PACKED SUBTRACTION

| Item | Sign | Hexadecimal |
|---|---|---|
| Requested operation | − | Subtract |
| A side operand | + | 684F |
| B side operand | − | 193B |
| Executed operation | + | Add |
| Result | + | 877C |

For the zoned decimal numbers, the next to the last hex symbol on the right denotes the sign code. For the packed decimal numbers, the hex symbols on the right-hand side denote the sign codes. These codes are in accordance with the list of decimal sign codes set forth in Table II above.

The sign of the resultant output number is always of the same polarity as the sign of the A side input operand supplied to A register 21. The A side input sign code is however, always converted to the preferred output sign code, but the polarity indicated by the output sign code is always the same as the polarity indicated by the A side input sign code.

As previously explained, the arithmetic unit 10 can sometimes produce a result in complement form. If the arithmetic operation is subtraction and the numerical value of the B side input operand is larger in magnitude than the numerical value of the A side input operand, then the resultant output number supplied to the Z register 53 will be in complement form and a recomplementation operation is necessary. The recomplement operation is accomplished by channeling the resultant number in the Z register 53 back through the B side of the arithmetic unit 10 and subtracting it from an A side input value equal to zero. In the recomplement operation, the arithmetic operation is always subtraction regardless of the sign of the number being recomplemented. The correct sign for the resulting recomplemented number as it appears at the output of the output corrector 50 is always opposite in polarity to the sign of the number supplied back to the B register 31 to be recomplemented.

Table XXI illustrates the recomplement action for a typical pair of zoned decimal numbers while Table XXII illustrates this operation for a typical pair of packed decimal numbers.

TABLE XXI

ZONED ADD AND RECOMPLEMENT

| Item | Sign | Hexadecimal |
|---|---|---|
| Requested operation | + | Add |
| A side operand | + | F1A9 |
| B side operand | − | F6D8 |
| Executed operation | − | Subtract |
| Complement result | + | F5F1 |
| Recomplement operation | − | Subtract |
| Final result | − | F4D9 |

TABLE XXII

PACKED ADD AND RECOMPLEMENT

| Item | Sign | Hexadecimal |
|---|---|---|
| Requested operation | + | Add |
| A side operand | + | 193E |
| B side operand | − | 684B |
| Executed operation | − | Subtract |
| Complement result | + | 509C |
| Recomplement operation | − | Subtract |
| Final result | − | 491D |

Note that the sign of the final result is in each case opposite in polarity to the sign of the complement result.

The arithmetic unit 10 considerably improves the performance of decimal arithmetic. If the output result of a decimal arithmetic operation is in true form (as opposed to complement form), then the speed of the decimal arithmetic with the arithmetic unit 10 is comparable to binary arithmetic for operands of comparable widths. If the decimal operation produces a result in complement form, it would have to be recomplemented and thus be one operation slower than binary for which complement results are valid and an acceptable output.

In the representative embodiment described in detail hereinabove, the binary arithmetic circuitry for arithmetically combining the two operands is represented by the carry look-ahead parallel binary adder 20. It is noted, however, that the arithmetic circuitry represented by adder 20 could instead take the form of a parallel binary subtractor. Thus, for example, a four-byte borrow look-ahead parallel binary subtractor could be used in place of the four-byte carry look-ahead binary adder 20. If a subtractor is used instead of an adder, then the add/subtract control function is inverted. In particular, the B side input operand is complemented to perform an addition operation and is not complemented when performing a subtraction operation. Also, the hex field carry-out signals become borrow-out signals instead of carry-out signals. In other words, as is known, subtractors are concerned with borrow-in and borrow-out signals, as opposed to carry-in and carry-out signals.

It is further noted that the various hardware embodiments described hereinabove were explained primarily in terms of circuit combinations employing positive logic. This was deliberately done to simplify an understanding of the basic concepts. It should be understood, however, that such embodiments can also be explained in terms of circuit combinations employing negative logic or a mixture of positive and negative logic. It is further noted that the representative forms of construction for the logic circuitry, switching circuitry and the like described hereinabove were implemented by means of AND, OR and NOT circuits. This was also done to simplify the understanding process. It should be understood, however, that such circuitry can also be implemented in whole or in part by means of NAND circuits or NOR circuits or other forms of logic circuits.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An arithmetic unit for performing arithmetic operations with multidigit binary coded numbers in zoned format wherein each multidigit number is comprised of a sequence of binary bits which is subdivided into alternate zone fields and digit fields, such arithmetic unit comprising:

binary arithmetic circuitry for arithmetically combining two multibit binary bit sequences to produce an output multibit binary bit sequence representing the results of the arithmetic operation;

first modifier circuitry for receiving a first multidigit zoned binary coded number and causing any nonzero bits in the zone fields thereof to assume a binary value of zero and supplying the resulting number to a first input side of the binary arithmetic circuitry;

second modifier circuitry for receiving a second multidigit zoned binary coded number and causing any zero bits in the zone fields thereof to assume a binary value of one and supplying the resulting number to a second input side of the binary arithmetic circuitry;

and third modifier circuitry coupled to the output side of the binary arithmetic circuitry for producing an output binary bit sequence wherein the bits in each zone field position therein have the proper zone code values.

2. An arithmetic unit for performing arithmetic operations with multidigit binary coded numbers in zoned format wherein each multidigit number is comprised of a sequence of M binary bits which is subdivided into alternate N-bit zone fields and N-bit digit fields, such arithmetic unit comprising:

parallel binary arithmetic circuitry for simultaneously arithmetically combining two M-bit binary bit sequences to produce an output M-bit binary bit sequence representing the results of the arithmetic operation;

first modifier circuitry for receiving a first M-bit multidigit zoned binary coded number and causing any nonzero bits in the N-bit zone fields thereof to assume a binary value of zero and supplying the resulting number to a first input side of the binary arithmetic circuitry;

second modifier circuitry for receiving a second M-bit multidigit zoned binary coded number and causing any zero bits in the N-bit zone fields thereof to assume a binary value of one and supplying the resulting number to a second input side of the binary arithmetic circuitry;

and third modifier circuitry coupled to the output side of the binary arithmetic circuitry for producing an output M-bit binary bit sequence wherein the bits in each N-bit zone field position therein have the proper zone code values.

3. An arithmetic unit for performing arithmetic operations with multidigit binary coded decimal numbers in zoned format wherein each multidigit number is comprised of a sequence of binary bits which is subdivided into alternate four-bit zone fields and four-bit digit fields, such arithmetic unit comprising:

parallel binary adder circuitry for adding two multibit binary bit sequences to produce an output multibit binary bit sequence representing the sum of the two input bit sequences;

first modifier circuitry for receiving a first multidigit zoned binary coded decimal number and forcing each bit in the zone fields thereof to assume a binary value of zero and supplying the resulting number to a first input side of the binary adder circuitry;

second modifier circuitry for receiving a second multidigit zoned binary coded decimal number and forcing each bit in the zone fields thereof to assume a binary value of one and supplying the resulting number to a second input side of the binary adder circuitry;

and third modifier circuitry coupled to the output side of the binary adder circuitry for receiving the output binary bit sequence produced by the binary adder circuitry and causing the bits in each zone field position therein to assume the proper zone code values.

4. An arithmetic unit for performing arithmetic operations with multidigit binary coded decimal numbers in zoned format wherein each multidigit number is comprised of a sequence of binary bits which is subdivided into alternate zone fields and digit fields with the zone field adjacent the lease significant digit field being used as a polarity-indicating sign field, such arithmetic unit comprising:

binary arithmetic circuitry for arithmetically combining two multibit binary bit sequences to produce an output multibit binary bit sequence representing the results of the arithmetic operation;

first modifier circuitry for receiving a first multidigit zoned binary coded decimal number and causing any nonzero bits in the zone and sign fields thereof to assume a binary value of zero and supplying the resulting number to a first input side of the binary arithmetic circuitry;

second modifier circuitry for receiving a second multidigit zoned binary coded decimal number and causing any zero bits in the zone and sign fields thereof to assume a binary value of one and supplying the resulting number to a second input side of the binary arithmetic circuitry;

and third modifier circuitry coupled to the output side of the binary arithmetic circuitry for receiving the output binary bit sequence produced by the binary arithmetic circuitry and causing the bits in the sign field position therein to assume proper sign code values and causing the bits in each of the other zone field positions therein to assume the proper zone code values.

5. An arithmetic unit for performing arithmetic operations with multidigit binary coded decimal numbers in zoned format wherein each multidigit number is comprised of a sequence of binary bits which is subdivided into alternate zone fields and digit fields with the zone field adjacent the least significant digit field being used as a polarity-indicating sign field, such arithmetic unit comprising:

binary arithmetic circuitry for arithmetically combining two multibit binary bit sequences to produce an output multibit binary bit sequence representing the results of the arithmetic operation;

first modifier circuitry for receiving a first multidigit zoned binary coded decimal number and causing any nonzero bits in the zone and sign fields thereof to assume a binary value of zero and supplying the resulting number to a first input side of the binary arithmetic circuitry;

second modifier circuitry for receiving a second multidigit zoned binary coded decimal number and causing any zero bits in the zone and sign fields thereof to assume a binary value of one and including selectively operable complement circuitry capable of complementing the digit fields in the second number, the output of this second modifier circuitry being coupled to a second input side of the binary arithmetic circuitry;

and third modifier circuitry coupled to the output side of the binary arithmetic circuitry for receiving the output binary bit sequence produced by the binary arithmetic circuitry and causing the bits in the sign field position therein to assume sign code values which indicate the same polarity as indicated by the sign code field of the number received by the first modifier circuitry and causing the bits in each of the other zone field positions therein to assume the proper zone code values.

6. An arithmetic unit for performing arithmetic operations with multidigit binary coded decimal numbers in zoned format wherein each multidigit number is comprised of a sequence of binary bits which is subdivided into alternate zone fields and digit fields, such arithmetic unit comprising:

binary arithmetic circuitry for arithmetically combining two multibit binary bit sequences to produce an output multibit binary sequence representing the results of the arithmetic operation;

first modifier circuitry for receiving a first multidigit zoned binary coded decimal number and causing any nonzero bits in the zone fields thereof to assume a binary value of zero and supplying the resulting number to a first input side of the binary arithmetic circuitry;

second modifier circuitry for receiving a second multidigit zoned binary coded decimal number and causing any zero bits in the zone fields thereof to assume a binary value of one and supplying the resulting number to a second input side of the binary arithmetic circuitry;

circuitry included in one of the first and second modifier circuitries for causing the number values in the digit field in the number received by such modifier circuitry to be increased by a factor of six;

and third modifier circuitry coupled to the output side of the binary arithmetic circuitry for receiving the output binary bit sequence produced by the binary arithmetic circuitry and including circuitry for causing the bits in each zone field position therein to assume the proper zone code values and further including circuitry for receiving digit field carry-out status signals from the binary arithmetic circuitry and circuitry responsive to such status signals for causing the number values in the digit fields of the output binary bit sequence to be decreased by a factor of six for those digit fields for which the corresponding carry-out status signals have a particular carry/no-carry status condition.

7. An arithmetic unit for performing arithmetic operations with multidigit binary coded decimal numbers in either zoned decimal format or packed decimal format, such arithmetic unit comprising:

binary arithmetic circuit for arithmetically combining two multibit binary bit sequences to produce an output multibit bit sequence representing the results of the arithmetic operation;

control signal input circuitry for receiving a format status signal providing a zoned status indication for zoned decimal operation and a packed status indication for packed decimal operation;

first modifier circuitry for receiving a first multidigit binary coded decimal number and responsive to the format status signal for causing any nonzero bits in the zoned decimal zone and sign field positions to assume a binary value of zero when a zoned status is indicated and for causing any nonzero bits in the packed decimal sign field position to assume a binary value of zero when a packed status is indicated, the output of this first modifier circuitry being coupled to a first input side of the binary arithmetic circuitry;

second modifier circuitry for receiving a second multidigit binary coded decimal number and responsive to the format status signal for causing any zero bits in the zoned decimal zone and sign field positions to assume a binary value of one when a zoned status is indicated and for causing any zero bits in the packed decimal sign field position to assume a binary value of one when a packed status is indicated, the output of this second modifier circuitry being coupled to a second input side of the binary arithmetic circuitry;

and third modifier circuitry coupled to the output side of the binary arithmetic circuitry for receiving the output binary bit sequence produced by the binary arithmetic circuitry and responsive to the format status signal for producing an output binary bit sequence wherein the bits in the zoned decimal zone and sign field positions have the proper zone and sign code values when a zoned status is indicated and wherein the bits in the packed decimal sign field position have the proper sign code values when a packed status is indicated.

8. An arithmetic unit for performing arithmetic operations with multidigit binary coded decimal numbers in either zoned decimal format or packed decimal format, such arithmetic unit comprising:

binary arithmetic circuitry for arithmetically combining two multibit binary bit sequences to produce an output multibit binary bit sequence representing the results of the arithmetic operation;

control signal input circuitry for receiving a format status signal providing a zoned status indication for zoned decimal operation and a packed status indication for packed decimal operation;

first modifier circuitry for receiving a first multidigit binary coded decimal number and responsive to the format status signal for causing any nonzero bits in the zoned decimal zone and sign field positions to assume a binary value of zero when a zoned status is indicated and for causing any nonzero bits in the packed decimal sign field position to assume a binary value of zero when a packed status is indicated, the output of this first modifier circuitry being coupled to a first input side of the binary arithmetic circuitry;

second modifier circuitry for receiving a second multidigit binary coded decimal number and responsive to the format status signal for causing any zero bits in the zoned decimal zone and sign field positions to assume a binary value of one when a zoned status is indicated and for causing any zero bits in the packed decimal sign field position to assume a binary value of one when a packed status is indicated, the output of this second modifier circuitry being coupled to a second input side of the binary arithmetic circuitry;

sign control circuitry for detecting the polarities of the numbers supplied to the first and second modifier circuitries and developing a sign control signal;

and third modifier circuitry coupled to the output side of the binary arithmetic circuitry for receiving the output binary bit sequence produced by the binary arithmetic circuitry and responsive to the format status signal and the sign control signal for producing an output binary bit sequence wherein the bits in the zoned decimal zone and sign field positions have the proper zone and sign code values when a zoned status is indicated and wherein the bits in the packed decimal sign field position have the proper sign code values when a packed status is indicated.

9. An arithmetic unit for performing arithmetic operations with multidigit binary coded decimal numbers in zoned format wherein each multidigit number is comprised of a sequence of binary bits which is subdivided into alternate zone fields and digit fields with one of the zone fields being used as a sign field to indicate the polarity of the number, such arithmetic unit comprising:

binary arithmetic circuitry for selectively adding or subtracting two multidigit binary coded decimal numbers;

first modifier circuitry for receiving a first multidigit zoned binary coded decimal number and causing any nonzero bits in the zone and sign fields thereof to assume a binary value of zero and supplying the resulting number to a first input side of the binary arithmetic circuitry;

second modifier circuitry for receiving a second multidigit zoned binary coded decimal number and causing any zero bits in the zone and sign fields thereof to assume a binary value of one and supplying the resulting number to a second input side of the binary arithmetic circuitry;

sign handling circuitry responsive to the sign fields in the two received numbers and to an external selection signal for selecting the arithmetic operation performed by the binary arithmetic circuitry;

third modifier circuitry coupled to the output side of the binary arithmetic circuitry for producing an output binary bit sequence wherein the bits in each zone field position therein have the proper zone code values;

and sign control circuitry coupled to the third modifier circuitry and responsive to the sign field in at least one of the received numbers for causing the bits in the sign field position in the output bit sequence to have the proper sign code values.

10. An arithmetic unit for performing arithmetic operations with positive and negative binary coded decimal numbers each having one or more digit fields representing digit values and a sign field representing the polarity of the number, such arithmetic unit comprising:

binary adder circuitry for adding two multidigit binary numbers;

first input circuitry for receiving a first binary coded decimal number and supplying same to a first input side of the binary adder circuitry;

second input circuitry for receiving a second binary coded decimal number and supplying same to the second input side of the binary adder circuitry;

plus six/complement circuitry coupled in circuit between the second input circuitry and the second input side of the binary adder circuitry and selectively operable for supplying the second binary coded decimal number to the adder circuitry in either plus six form or complement form;

sign handling circuitry responsive to the sign fields in the two received numbers and to an external selection signal for controlling the plus six/complement action of the plus six/complement circuitry;

output circuitry for receiving the output number produced by the binary adder circuitry;

sign control circuitry coupled to the output circuitry and normally operative to set the sign field in the output number to indicate the same polarity as indicated by the sign field of the number received by the first input circuitry;

complement detector circuitry for determining whether the output number is in complement form;

and circuitry operable in the event that the output number is in complement form for supplying such output number back to the second input circuitry, for causing the plus six/complement circuitry to complement such number, for causing the adder circuitry to add the resulting complemented number to a first input circuitry number value of zero and for causing the sign control circuitry to set the sign field in the resulting adder circuitry output number to indicate a polarity opposite to the polarity of the original output number.

11. A digital arithmetic unit for adding and subtracting multidigit binary coded decimal numbers having a zoned format comprising:

a parallel binary adder for adding pure binary numbers;

input modifier cicuitry for receiving a pair of multidigit zoned binary coded decimal numbers and supplying same to the two input sides of the adder, such modifier circuitry including circuitry for preconditioning the zone and sign fields in the two received numbers for enabling the proper propagation of digit carries across the zone and sign fields during the performance of the addition inside the adder;

and output modifier circuitry for receiving the output binary bit sequence produced by the adder and causing the bits in the zone and sign field positions therein to assume the proper zone and sign code values.

12. A digital arithmetic unit for adding and subtracting multidigit binary coded decimal numbers having a zoned format comprising:

a parallel binary subtractor for subtracting pure binary numbers;

input modifier circuitry for receiving a pair of multidigit zoned binary coded decimal numbers and supplying same to the two input sides of the subtractor, such modifier circuitry including circuitry for preconditioning the zone and sign fields in the two received numbers for enabling the proper propagation of digit borrows across the zone and sign fields during the performance of the subtraction inside the subtractor;

and output modifier circuitry for receiving the output binary bit sequence produced by the subtractor and causing the bits in the zone and sign field positions therein to assume the proper zone and sign code values.

13. In an arithmetic unit having arithmetic circuitry for selectively adding or subtracting first and second numerical operands each having a plural bit sign field encoded to represent the polarity of the operand and wherein there are plural codes for each of the positive and negative polarities, automatic sign handling circuitry comprising:

first sign code detector circuitry for decoding the plural-bit sign field of the first operand for producing a polarity signal indicating the polarity of the first operand;

second sign code detector circuitry for decoding the plural-bit sign field of the second operand for producing a polarity signal indicating the polarity of the second operand;

circuitry for receiving a further polarity signal indicating whether the requested arithmetic operation is addition or subtraction;

a first exclusive OR circuit responsive to two of the polarity signals for producing an intermediate signal;

and a second exclusive OR circuit responsive to the intermediate signal and to the third polarity signal for producing a control signal for controlling the arithmetic operation actually performed by the arithmetic circuitry.

14. In an arithmetic unit having arithmetic circuitry for selectively adding or subtracting first and second binary coded decimal operands in either zoned or packed format wherein each operand includes a four-bit sign field encoded to represent the polarity of the operand with the location of the sign field being different for the zoned and packed formats, automatic sign handling circuitry comprising:

a fist sign code detector for decoding the four bits at the zoned format sign field location in the first operand for producing a first polarity indicating signal;

a second sign code detector for decoding the four bits at the packed format sign field location in the first operand for producing a second polarity indicating signal;

a third sign code detector for decoding the four bits at the zoned format sign field location in the second operand for producing a third polarity indicating signal;

a fourth sign code detector for decoding the four bits at the packed format sign field location in the second operand for producing a fourth polarity indicating signal;

circuitry for enabling only the first and third sign code detectors when the operands are in a zoned format and for enabling only the second and fourth sign code detectors when the operands are in a packed format;

a first exclusive OR circuit having one input coupled to the outputs of the first and second sign code detectors and a second input coupled to the outputs of the third and fourth sign code detectors;

circuitry for receiving a requested operation signal indicating whether addition or subtraction is requested;

and a second exclusive OR circuit having one input coupled to the output of the first exclusive OR circuit and a second input responsive to the requested operation signal for producing a control signal for controlling the arithmetic operation actually performed by the arithmetic circuitry.

* * * * *

UNITED STATES PATENT OFFICE
CERTIFICATE OF CORRECTION

PATENT NO. : 4,001,570

DATED : January 4, 1977

INVENTOR(S) : David N. Gooding and Everett M. Shimp

It is certified that error appears in the above-identified patent and that said Letters Patent are hereby corrected as shown below:

Column 1, line 55, the semicolon ";" should be a comma --,--. Column 2, line 2, "Afte" should read --After--; line 5, ' "unpacking. ' should read --"unpacking".--; line 7, "elimination" should read --eliminates--; line 11, "zone chemical" should read "zoned decimal"; line 42, "chemical" should read --decimal--; line 57, "of" should read --or--. Column 4, line 54, "chemical" should read --decimal--. Column 5, line 60, "hexidecimal" should read --hexadecimal--; line 65, "hexidecimal" should read --hexadecimal--. Column 6, line 30, "0195C" should read --01975C--; line 65, "outout" should read --output--. Column 7, line 35, "fouth" should read --fourth--. Column 8, line 58, "units" should read --unit--. Column 9, line 56, "4 -bits" should read --4 bits--. Column 10, line 42, after "set" insert --to--. Column 11, line 27, "It" should read --If--. Column 15, line 41, "jØ-J7" should read --JØ-J7--; line 62, "line" should read --lines--. Column 16, line 14, "lines" should read --line--; line 43, "hex Øhex 2," should read --hex Ø, hex 2,--; line 51, "Ø2," should read --Ø, 2,--. Column 18, line 27, "NØ-N3" should read --$\overline{NØ}$-$\overline{N3}$--; line 47, "M1 = N1.N2 + N1.N2" should read --M1 = N1.N2 + $\overline{N1.N2}$--; line 48, "M2 = N2" should read --M2 = $\overline{N2}$--. Column 19, line 13, "by" should read --be--. Column 22, line 30, after "circuit" insert --output--; line 37, after "zoned" insert --decimal--; line 58, after "sign" insert --field--. Column 24, line 9, "and" should read --an--; line 29, "add-subtract" should read --add/subtract--. Column 26, line 29, "one" should read --ones--. Column 28, line 22, "cirucit" should read --circuit--. Column 31, line 39, "circiut" should read --circuit--. Column 38, in TABLE XV, the binary digits "0  0  1  1" in the line or row labeled "Group carries", should be shown as being one column to the left of each of the main columns. Column 39, in TABLE XVI, the binary digits "0  0  0  0" in the line or row labeled

UNITED STATES PATENT OFFICE
CERTIFICATE OF CORRECTION

PATENT NO. : 4,001,570
DATED : January 4, 1977
INVENTOR(S) : David N. Gooding and Everett M. Shimp It is certified that error appears in the above-identified patent and that said Letters Patent are hereby corrected as shown below:

"Group carries", should be shown as being one column to the left of each of the main columns. Column 40, line 20, after "is" insert a comma --,--. Column 41, line 34, "hardward" should read --hardware--. Column 43, line 12, "lease" should read --least--. Column 44, line 16, after "binary" insert --bit--; line 32, "field" should read --fields--. Column 47, line 25, "cicuitry" should read --circuitry--.

Signed and Sealed this

Fifth Day of September 1978

[SEAL]

Attest:

RUTH C. MASON
*Attesting Officer*

DONALD W. BANNER
*Commissioner of Patents and Trademarks*